United States Patent
Jung et al.

(10) Patent No.: US 9,513,699 B2
(45) Date of Patent: Dec. 6, 2016

(54) METHOD OF SELECTING A SECOND CONTENT BASED ON A USER'S REACTION TO A FIRST CONTENT

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LL, Bellevue, WA (US)

( * ) Notice: Subject to any disclaimer, the term of this patent is extended or adjusted under 35 U.S.C. 154(b) by 487 days.

(21) Appl. No.: 11/977,752

(22) Filed: Oct. 24, 2007

(65) Prior Publication Data

US 2009/0113298 A1    Apr. 30, 2009

(51) Int. Cl.
*G06F 3/048* (2013.01)
*G06F 3/01* (2006.01)
*G06Q 30/02* (2012.01)

(52) U.S. Cl.
CPC .............. *G06F 3/011* (2013.01); *G06F 3/048* (2013.01); *G06Q 30/0212* (2013.01)

(58) Field of Classification Search
CPC .......... G06F 3/013; G06F 3/005; G06F 3/048; G06F 17/30247; G06F 17/30265; G06F 17/30256; G06F 17/30017; G06F 17/30032; G06F 17/30047; G06F 17/30038; G06F 17/30259; G06F 17/2765; G06F 17/30991; G06F 3/011; G06Q 30/0212
USPC ....................................................... 715/829
See application file for complete search history.

(56) References Cited

U.S. PATENT DOCUMENTS

| | | |
|---|---|---|
| 4,075,657 A | 2/1978 | Weinblatt |
| 4,670,798 A | 6/1987 | Campbell et al. |
| 4,931,865 A | 6/1990 | Scarampi |
| 4,984,098 A | 1/1991 | Buntsis |
| 5,117,407 A | 5/1992 | Vogel |
| 5,227,874 A | 7/1993 | Von Kohorn |
| 5,471,542 A | 11/1995 | Ragland |
| 5,485,139 A | 1/1996 | Tarnovsky |
| 5,657,004 A | 8/1997 | Whittaker et al. |

(Continued)

FOREIGN PATENT DOCUMENTS

WO    WO 2007/088536 A2    8/2007

OTHER PUBLICATIONS

Wearing definition. Webster's New World College Dictionary Copyright © 2010 by Wiley Publishing, Inc., Cleveland, Ohio. retrieved from http://www.yourdictionary.com/wearing on Oct. 29, 2013.*

(Continued)

*Primary Examiner* — Amy M Levy

(57) ABSTRACT

Embodiments include an apparatus, a system, a device, a computer program product, and a method. A method embodiment includes a method implemented in an environment that includes a person interacting with an electronic device via a user device. The method includes detecting a reaction by the person to a displayed first content. The method also includes determining a content attribute of the displayed first content. The method further includes facilitating a search for a second content based on the detected reaction and on the determined content attribute. The method includes displaying the second content in a manner perceivable by the person.

43 Claims, 20 Drawing Sheets

(56) References Cited

U.S. PATENT DOCUMENTS

| | | |
|---|---|---|
| 5,676,138 A | 10/1997 | Zawilinski |
| 5,731,805 A | 3/1998 | Tognazzini et al. |
| 5,923,252 A | 7/1999 | Sizer et al. |
| 5,982,357 A | 11/1999 | Burgett et al. |
| 6,064,383 A | 5/2000 | Skelly |
| 6,118,888 A * | 9/2000 | Chino ............... G06F 3/011 382/118 |
| 6,190,314 B1 | 2/2001 | Ark et al. |
| 6,219,657 B1 * | 4/2001 | Hatayama ............... 706/14 |
| 6,393,136 B1 | 5/2002 | Amir et al. |
| 6,401,050 B1 | 6/2002 | Cooke et al. |
| 6,453,194 B1 * | 9/2002 | Hill ............... 600/546 |
| 6,456,262 B1 | 9/2002 | Bell |
| 6,520,905 B1 | 2/2003 | Surve et al. |
| 6,577,329 B1 | 6/2003 | Flickner et al. |
| 6,585,521 B1 | 7/2003 | Obrador |
| 6,601,021 B2 | 7/2003 | Card et al. |
| 6,606,605 B1 | 8/2003 | Kolls |
| 6,622,140 B1 | 9/2003 | Kantrowitz |
| 6,637,883 B1 * | 10/2003 | Tengshe et al. ........... 351/210 |
| 6,651,045 B1 | 11/2003 | Macaulay |
| 6,656,116 B2 * | 12/2003 | Kim et al. ............... 600/300 |
| 6,687,608 B2 | 2/2004 | Sugimoto et al. |
| 6,704,034 B1 | 3/2004 | Rodriguez et al. |
| 6,708,176 B2 | 3/2004 | Strunk et al. |
| 6,731,307 B1 | 5/2004 | Strubbe et al. |
| 6,807,532 B1 | 10/2004 | Kolls |
| 6,807,675 B1 | 10/2004 | Maillard et al. |
| 6,816,802 B2 | 11/2004 | Kim et al. |
| 6,847,992 B1 | 1/2005 | Haitsuka et al. |
| 6,873,314 B1 * | 3/2005 | Campbell ............... 345/156 |
| 6,874,127 B2 * | 3/2005 | Newell ............... G06F 1/163 706/14 |
| 6,904,408 B1 | 6/2005 | McCarthy et al. |
| 6,968,334 B2 | 11/2005 | Salmenkaita et al. |
| 7,010,497 B1 | 3/2006 | Nyhan et al. |
| 7,100,818 B2 | 9/2006 | Swaine |
| 7,120,880 B1 | 10/2006 | Dryer et al. |
| 7,169,113 B1 | 1/2007 | Young |
| 7,181,693 B1 | 2/2007 | Anderson et al. |
| 7,197,472 B2 | 3/2007 | Conkwright et al. |
| 7,225,142 B1 | 5/2007 | Apte et al. |
| 7,228,327 B2 | 6/2007 | Shuster |
| 7,356,547 B2 | 4/2008 | Ozer et al. |
| 7,363,282 B2 * | 4/2008 | Karnawat et al. ............... 706/45 |
| 7,418,405 B1 | 8/2008 | Utter et al. |
| 7,460,150 B1 | 12/2008 | Coughlan et al. |
| 7,472,102 B1 | 12/2008 | Heckerman et al. |
| 7,495,659 B2 | 2/2009 | Marriott et al. |
| 7,503,653 B2 | 3/2009 | Endrikhovski et al. |
| 7,547,279 B2 | 6/2009 | Kim et al. |
| 7,555,287 B1 | 6/2009 | Heinonen et al. |
| 7,562,064 B1 | 7/2009 | Chickering et al. |
| 7,590,619 B2 * | 9/2009 | Hurst-Hiller et al. |
| 7,590,723 B2 | 9/2009 | Mager et al. |
| 7,599,918 B2 * | 10/2009 | Shen et al. |
| 7,636,672 B2 | 12/2009 | Angles et al. |
| 7,679,579 B2 | 3/2010 | Minatogawa |
| 7,689,672 B2 | 3/2010 | Kanojia et al. |
| 7,702,318 B2 | 4/2010 | Ramer et al. |
| 7,703,114 B2 | 4/2010 | Thukral |
| 7,703,611 B1 | 4/2010 | Appelman et al. |
| 7,720,784 B1 | 5/2010 | Froloff |
| 7,742,037 B2 | 6/2010 | Sako et al. |
| 7,760,910 B2 | 7/2010 | Johnson et al. |
| 7,762,665 B2 | 7/2010 | Vertegaal et al. |
| 7,764,311 B2 | 7/2010 | Bill |
| 7,769,632 B2 | 8/2010 | Giraud et al. |
| 7,769,764 B2 | 8/2010 | Ramer et al. |
| 7,779,436 B1 | 8/2010 | Kamen et al. |
| 7,836,481 B1 | 11/2010 | Hendricks |
| 7,839,423 B2 | 11/2010 | Ishiyama |
| 7,844,488 B2 | 11/2010 | Merriman et al. |
| 7,865,404 B2 | 1/2011 | Peckover |
| 7,874,983 B2 | 1/2011 | Zancho et al. |
| 7,881,493 B1 | 2/2011 | Edwards et al. |
| 7,904,439 B2 | 3/2011 | Horvitz et al. |
| 7,907,940 B2 | 3/2011 | Ramer et al. |
| 7,908,150 B2 | 3/2011 | Rochet |
| 7,930,199 B1 | 4/2011 | Hill |
| 7,930,206 B2 | 4/2011 | Koningstein |
| 7,931,602 B2 | 4/2011 | Kayahara et al. |
| 8,126,220 B2 | 2/2012 | Greig |
| 8,235,725 B1 | 8/2012 | Hill |
| 8,244,537 B2 | 8/2012 | Kondo et al. |
| 8,269,834 B2 | 9/2012 | Albertson et al. |
| 8,407,055 B2 | 3/2013 | Asano et al. |
| 8,473,044 B2 | 6/2013 | Lee et al. |
| 8,611,919 B2 | 12/2013 | Barnes, Jr. |
| 2001/0044751 A1 | 11/2001 | Pugliese, III et al. |
| 2001/0048439 A1 | 12/2001 | Young |
| 2002/0030163 A1 | 3/2002 | Zhang |
| 2002/0059370 A1 | 5/2002 | Shuster |
| 2002/0072952 A1 * | 6/2002 | Hamzy et al. ............... 705/10 |
| 2002/0107718 A1 * | 8/2002 | Morrill et al. ............... 705/10 |
| 2002/0112035 A1 * | 8/2002 | Carey et al. ............... 709/219 |
| 2002/0127623 A1 | 9/2002 | Minshull et al. |
| 2002/0130898 A1 | 9/2002 | Ogawa et al. |
| 2002/0139842 A1 | 10/2002 | Swaine |
| 2002/0173958 A1 | 11/2002 | Asano et al. |
| 2002/0174425 A1 | 11/2002 | Markel et al. |
| 2002/0184098 A1 | 12/2002 | Giraud et al. |
| 2002/0194501 A1 * | 12/2002 | Wenocur et al. ............... 713/201 |
| 2003/0001846 A1 | 1/2003 | Davis et al. |
| 2003/0060728 A1 | 3/2003 | Mandigo |
| 2003/0060897 A1 | 3/2003 | Matsuyama et al. |
| 2003/0078840 A1 | 4/2003 | Strunk et al. |
| 2003/0088463 A1 | 5/2003 | Kanevsky et al. |
| 2003/0128389 A1 * | 7/2003 | Matraszek et al. .......... 358/1.18 |
| 2003/0135582 A1 * | 7/2003 | Allen et al. ............... 709/217 |
| 2003/0187844 A1 * | 10/2003 | Li ............... G06F 17/30247 |
| 2003/0220835 A1 | 11/2003 | Barnes, Jr. |
| 2003/0236582 A1 | 12/2003 | Zamir et al. |
| 2004/0001616 A1 | 1/2004 | Gutta et al. |
| 2004/0092809 A1 * | 5/2004 | DeCharms ............... 600/410 |
| 2004/0101178 A1 * | 5/2004 | Fedorovskaya et al. ..... 382/128 |
| 2004/0148572 A1 | 7/2004 | Nakanishi et al. |
| 2004/0152957 A1 | 8/2004 | Stivoric et al. |
| 2004/0193488 A1 | 9/2004 | Khoo et al. |
| 2004/0242216 A1 | 12/2004 | Boutsikakis |
| 2005/0010637 A1 | 1/2005 | Dempski et al. |
| 2005/0013104 A1 | 1/2005 | Feague et al. |
| 2005/0017870 A1 | 1/2005 | Allison et al. |
| 2005/0021677 A1 * | 1/2005 | Musha et al. ............... 709/218 |
| 2005/0071865 A1 * | 3/2005 | Martins ............... 725/10 |
| 2005/0084259 A1 | 4/2005 | Manico et al. |
| 2005/0108092 A1 | 5/2005 | Campbell et al. |
| 2005/0131744 A1 | 6/2005 | Brown et al. |
| 2005/0157377 A1 | 7/2005 | Goldman et al. |
| 2005/0172319 A1 | 8/2005 | Reichardt et al. |
| 2005/0223237 A1 * | 10/2005 | Barletta ............... G06F 3/011 713/186 |
| 2005/0235338 A1 | 10/2005 | AbiEzzi et al. |
| 2005/0277813 A1 | 12/2005 | Katz et al. |
| 2005/0288954 A1 * | 12/2005 | McCarthy et al. ............... 705/1 |
| 2005/0289582 A1 | 12/2005 | Tavares et al. |
| 2006/0053377 A1 * | 3/2006 | Newell et al. ............... 715/744 |
| 2006/0064411 A1 | 3/2006 | Gross et al. |
| 2006/0074883 A1 * | 4/2006 | Teevan et al. ............... 707/3 |
| 2006/0075108 A1 | 4/2006 | Sylvain |
| 2006/0085818 A1 | 4/2006 | Bodlaender et al. |
| 2006/0093998 A1 * | 5/2006 | Vertegaal ............... G06F 3/011 434/236 |
| 2006/0122834 A1 | 6/2006 | Bennett |
| 2006/0129457 A1 | 6/2006 | Nyhan et al. |
| 2006/0133586 A1 | 6/2006 | Kasai et al. |
| 2006/0143647 A1 * | 6/2006 | Bill ............... 725/10 |
| 2006/0146281 A1 * | 7/2006 | Goodall et al. ............... 351/168 |
| 2006/0170945 A1 * | 8/2006 | Bill ............... 358/1.13 |
| 2006/0195441 A1 | 8/2006 | Julia et al. |
| 2006/0208085 A1 * | 9/2006 | Cohen et al. ............... 235/472.01 |
| 2006/0224046 A1 | 10/2006 | Ramadas et al. |
| 2006/0282309 A1 | 12/2006 | Zhang et al. |
| 2007/0021058 A1 | 1/2007 | Arseneau et al. |

(56) References Cited

U.S. PATENT DOCUMENTS

| | | | |
|---|---|---|---|
| 2007/0033050 A1* | 2/2007 | Asano | G06F 17/30026 704/270 |
| 2007/0052672 A1* | 3/2007 | Ritter et al. | 345/156 |
| 2007/0055169 A1* | 3/2007 | Lee | A61B 5/0006 600/544 |
| 2007/0061244 A1* | 3/2007 | Ramer et al. | 705/37 |
| 2007/0061753 A1 | 3/2007 | Ng et al. | |
| 2007/0066323 A1 | 3/2007 | Park et al. | |
| 2007/0066916 A1 | 3/2007 | Lemos | |
| 2007/0104369 A1 | 5/2007 | Weatherhead | |
| 2007/0105071 A1 | 5/2007 | Weatherhead | |
| 2007/0112758 A1* | 5/2007 | Livaditis | G06F 17/30696 |
| 2007/0150916 A1 | 6/2007 | Begole et al. | |
| 2007/0162505 A1 | 7/2007 | Cecchi et al. | |
| 2007/0167689 A1 | 7/2007 | Ramadas et al. | |
| 2007/0168413 A1 | 7/2007 | Barletta et al. | |
| 2007/0184420 A1 | 8/2007 | Mathan et al. | |
| 2007/0191691 A1 | 8/2007 | Polanco | |
| 2007/0205963 A1 | 9/2007 | Piccionelli et al. | |
| 2007/0208719 A1* | 9/2007 | Tran | 707/3 |
| 2007/0214471 A1 | 9/2007 | Rosenberg | |
| 2007/0220010 A1 | 9/2007 | Ertugrul | |
| 2007/0220040 A1 | 9/2007 | Do | |
| 2007/0223871 A1 | 9/2007 | Thelen | |
| 2007/0233622 A1* | 10/2007 | Willcock | G06F 17/30867 706/16 |
| 2007/0239847 A1* | 10/2007 | Takehara et al. | 709/217 |
| 2007/0265090 A1 | 11/2007 | Barsness et al. | |
| 2007/0265507 A1 | 11/2007 | de Lemos | |
| 2007/0287415 A1 | 12/2007 | Yamada | |
| 2007/0293731 A1 | 12/2007 | Downs et al. | |
| 2007/0294064 A1 | 12/2007 | Shuster | |
| 2008/0004989 A1 | 1/2008 | Yi | |
| 2008/0052219 A1 | 2/2008 | Sandholm et al. | |
| 2008/0065468 A1* | 3/2008 | Berg et al. | 705/10 |
| 2008/0091512 A1 | 4/2008 | Marci et al. | |
| 2008/0091515 A1 | 4/2008 | Thieberger et al. | |
| 2008/0097854 A1 | 4/2008 | Young | |
| 2008/0104045 A1 | 5/2008 | Cohen et al. | |
| 2008/0114756 A1* | 5/2008 | Konig et al. | 707/5 |
| 2008/0146892 A1 | 6/2008 | LeBoeuf et al. | |
| 2008/0147488 A1 | 6/2008 | Tunick et al. | |
| 2008/0162142 A1 | 7/2008 | Yu et al. | |
| 2008/0222671 A1 | 9/2008 | Lee et al. | |
| 2008/0235284 A1 | 9/2008 | Aarts et al. | |
| 2008/0235594 A1 | 9/2008 | Bhumkar et al. | |
| 2008/0249838 A1 | 10/2008 | Angell et al. | |
| 2008/0255949 A1 | 10/2008 | Genco et al. | |
| 2008/0281661 A1 | 11/2008 | Young et al. | |
| 2008/0295126 A1 | 11/2008 | Lee et al. | |
| 2008/0306913 A1 | 12/2008 | Newman et al. | |
| 2008/0313033 A1 | 12/2008 | Guo et al. | |
| 2009/0006188 A1 | 1/2009 | Guo et al. | |
| 2009/0018911 A1 | 1/2009 | An Chang et al. | |
| 2009/0030978 A1 | 1/2009 | Johnson et al. | |
| 2009/0062679 A1 | 3/2009 | Tan et al. | |
| 2009/0076887 A1 | 3/2009 | Spivack et al. | |
| 2009/0089678 A1 | 4/2009 | Sacco et al. | |
| 2009/0100015 A1 | 4/2009 | Golan | |
| 2009/0112656 A1 | 4/2009 | Jung et al. | |
| 2009/0112693 A1 | 4/2009 | Jung et al. | |
| 2009/0112695 A1 | 4/2009 | Jung et al. | |
| 2009/0112696 A1 | 4/2009 | Jung et al. | |
| 2009/0112713 A1 | 4/2009 | Jung et al. | |
| 2009/0132368 A1 | 5/2009 | Cotter et al. | |
| 2009/0138565 A1 | 5/2009 | Shiff et al. | |
| 2009/0150363 A1* | 6/2009 | Gross et al. | 707/3 |
| 2009/0157813 A1 | 6/2009 | Jung et al. | |
| 2009/0163777 A1 | 6/2009 | Jung et al. | |
| 2009/0164131 A1 | 6/2009 | Jung et al. | |
| 2009/0164132 A1 | 6/2009 | Jung et al. | |
| 2009/0171164 A1 | 7/2009 | Jung et al. | |
| 2009/0216744 A1 | 8/2009 | Shriwas et al. | |
| 2009/0254971 A1* | 10/2009 | Herz et al. | 726/1 |
| 2010/0010289 A1 | 1/2010 | Clare | |
| 2010/0010366 A1 | 1/2010 | Silberstein | |
| 2010/0122178 A1* | 5/2010 | Konig et al. | 715/738 |
| 2010/0174586 A1 | 7/2010 | Berg, Jr. et al. | |
| 2010/0250513 A1 | 9/2010 | Guha | |
| 2011/0223884 A1* | 9/2011 | Lau et al. | 455/410 |
| 2011/0238657 A1 | 9/2011 | Hammond et al. | |

OTHER PUBLICATIONS

Issetoglu et al. Functional Near-Infrared Neuroimaging. IEEE Transactions on Neural Systems and Rehabilitation Engineering, vol. 13, No. 2, Jun. 2005. pp. 153-159.*
U.S. Appl. No. 11/977,748, Jung et al.
U.S. Appl. No. 11/978,206, Jung et al.
U.S. Appl. No. 11/978,534, Jung et al.
U.S. Appl. No. 11/980,321, Jung et al.
U.S. Appl. No. 11/981,573, Jung et al.
U.S. Appl. No. 11/983,406, Jung et al.
U.S. Appl. No. 11/998,779, Jung et al.
U.S. Appl. No. 11/998,826, Jung et al.
U.S. Appl. No. 11/998,820, Jung et al.
U.S. Appl. No. 12/001,759, Jung et al.
U.S. Appl. No. 12/006,792, Jung et al.
U.S. Appl. No. 12/006,793, Jung et al.
U.S. Appl. No. 12/011,031, Jung et al.
Arapakis et al.; "Using Facial Expressions and Peripheral Physiological Signals as Implicit Indicators of Topical Relevance"; proceedings of the 17th ACM International Conference on Multimedia (provided by examiner); Oct. 19-24, 2009; pp. 461-470; ACM.
Kelly et al.; "Biometric Response as a Source of Query Independent Scoring in Lifelog Retrieval"; Lecture Notes in Computer Science; 2010; pp. 520-531; vol. 5993; Springer-Verlag Berlin Heidelberg.
Maglio et al.; "Attentive Agents"; Communications of the ACM; bearing a date of Mar. 2003; pp. 47-51; vol. 46, No. 3; ACM.
Maglio et al.; "Suitor: An Attentive Information System"; IUI 2000; bearing a date of 2000; pp. 169-176; ACM.
Puolamäki et al.; "Combining Eye Movements and Collaborative Filtering for Proactive Information Retrieval"; SIGIR '05; bearing a date of Aug. 15-19, 2005; pp. 146-153; ACM.
Salojärvi et al.; "Implicit Relevance Feedback from Eye Movements"; Artificial Neural Networks: Biological Inspirations-ICANN; bearing a date of 2005; pp. 513-518; Lecture Notes in Computer Science vol. 3696; Springer-Verlag Berlin Heidelberg.
Bayliss, Jessica D.; "Use of the Evoked Potential P3 Component for Control in a Virtual Apartment"; IEEE Transactions on Neural Systems and Rehabilitation Engineering; Jun. 2003; pp. 113-116; vol. 11, No. 2; IEEE.
Sellers et al.; "A P300-based brain-computer interface: Initial tests by ALS patients"; Clinical Neurophysiology; bearing a date of 2006; pp. 538-548; vol. 117; Elsevier Ireland Ltd.
Definition from Webster's Desk Dictionary of the English Language; "static"; Webster's Desk Dictionary of the English Language; 1990; pp. 1-2; Portland House; New York (as provided by examiner).
Webster's Desk Dictionary of the English Language; 1983; p. 320, Random House, Inc.

* cited by examiner

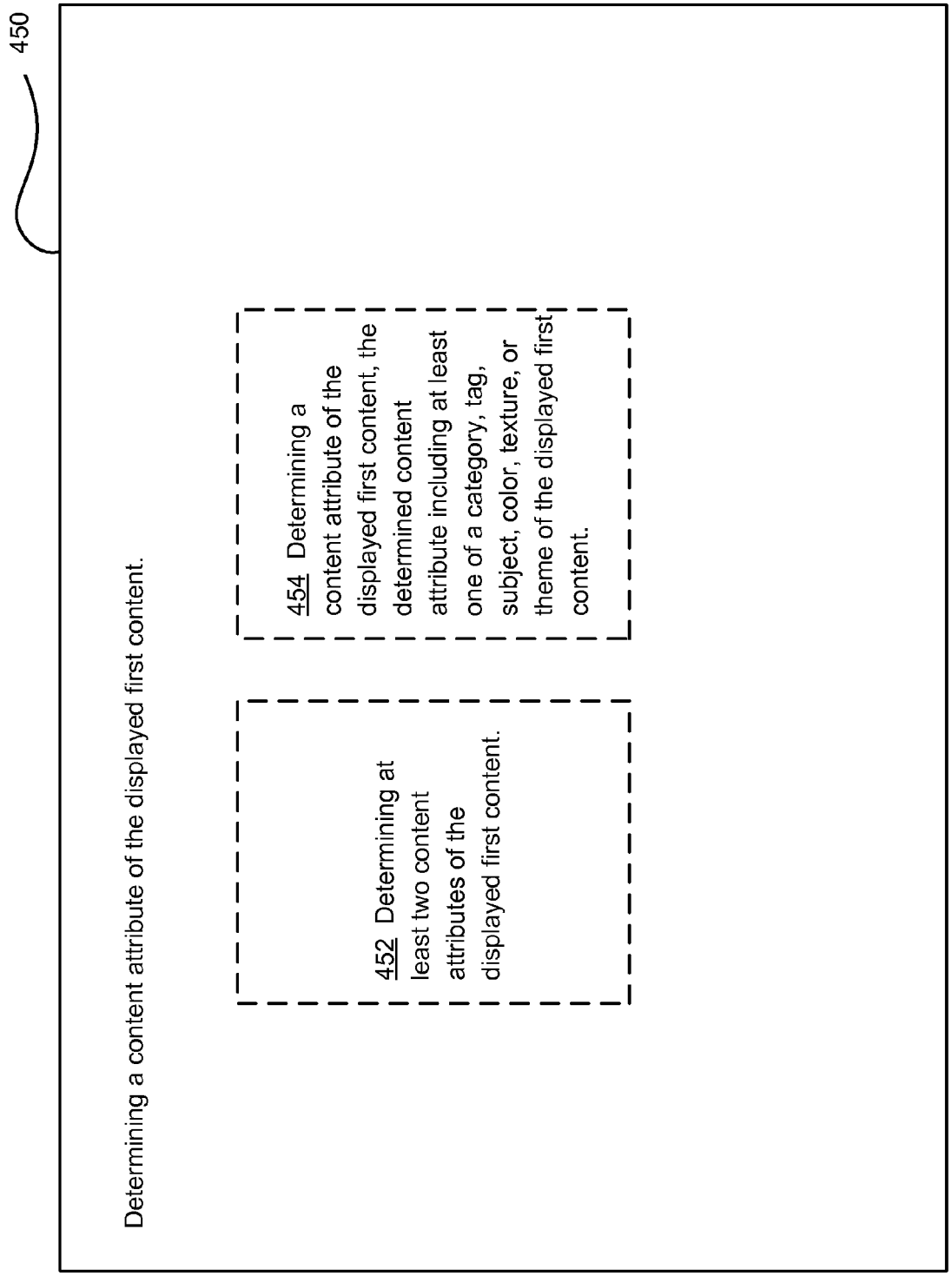

Facilitating a search for a second content based on the detected reaction and on the determined content attribute.

---

462 Searching a local data store for a second content based on the detected reaction and on the determined content attribute.

---

466 Facilitating a search by a Web search engine for a second content based on the detected reaction and on the determined content attribute.

---

472 Facilitating a search for at least two instances of a second content based on the detected reaction and on the determined content attribute.

---

464 Facilitating a search by a search engine for a second content based on the detected reaction and on the determined content attribute.

---

468 Facilitating a search for a second content by a search algorithm responsive to the detected reaction and on the determined content attribute.

---

474 Facilitating a search for a second content based on at least one of a positive correlation, or a negative correlation between the detected reaction and on the determined content attribute.

610 Computer-readable storage medium bearing the program instructions.

620 Program instructions operable to perform a process in a computing device, the process comprising:

detect a reaction by a person to a displayed first content;

determine a content attribute of the displayed first content;

facilitate a search for a second content based on the detected reaction and on the determined content attribute;

select the second content from a result of the facilitated search; and save data indicative of the selected second content.

622 Facilitating a display of the selected second content.

705 Electronic device.

710 Means for detecting a reaction by a person to a displayed first content.

720 Means for determining a content attribute of the displayed first content.

730 Means for facilitating a search for a second content based on the detected reaction and on the determined content attribute.

740 Means for displaying the second content in a manner perceivable by the person.

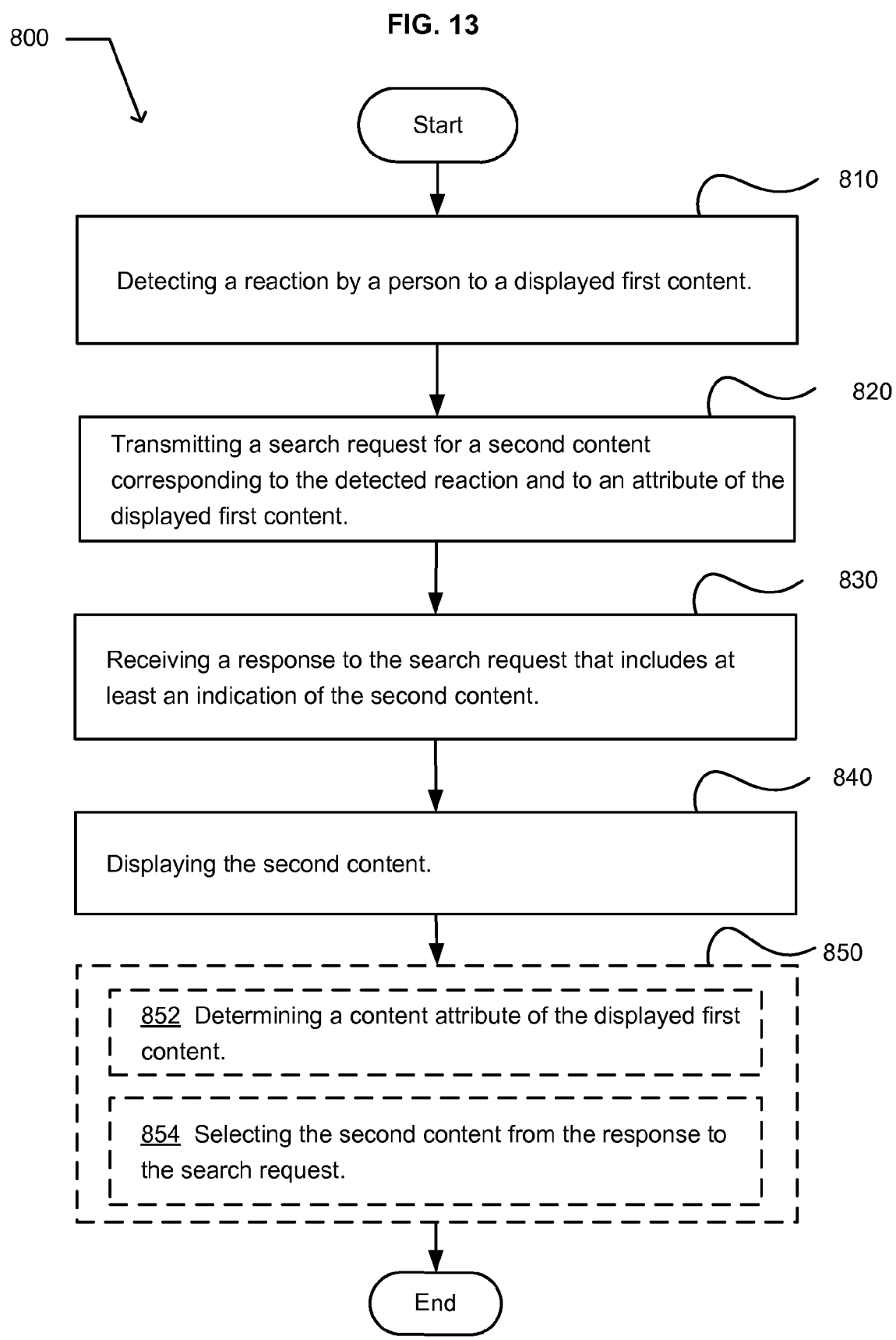

FIG. 14

862 Computer-readable storage medium bearing the program instructions.

864 Program instructions operable to perform a process in a computing device, the process comprising:

detect a reaction by a person to a displayed first content;

transmit a search request for a second content corresponding to the detected reaction and to an attribute of the displayed first content;

receive a response to the search request that includes at least an indication of the second content;

save data indicative of the received response to the search request; and display the second content.

866 Select the second electronic content from the received response to the search request.

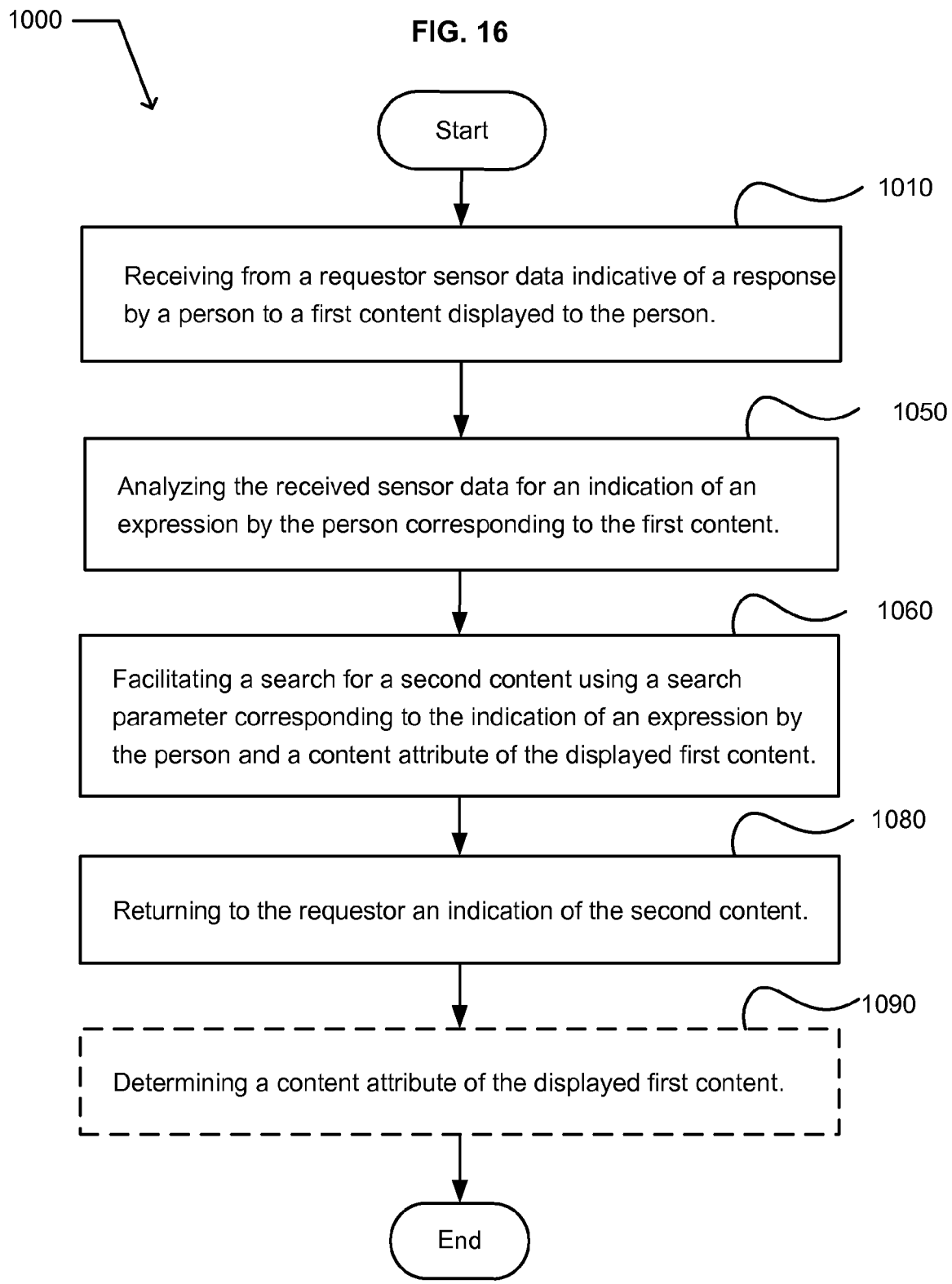

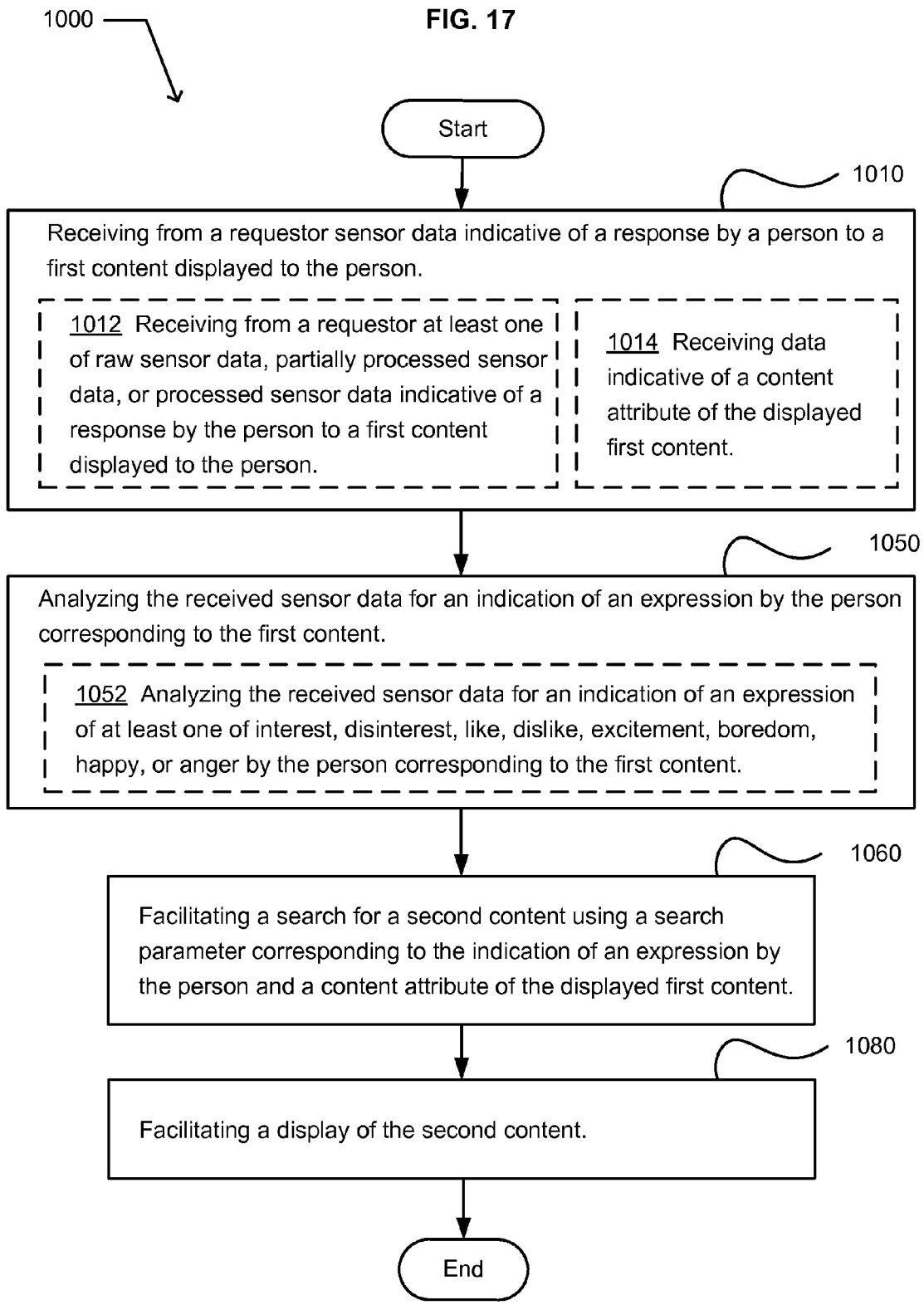

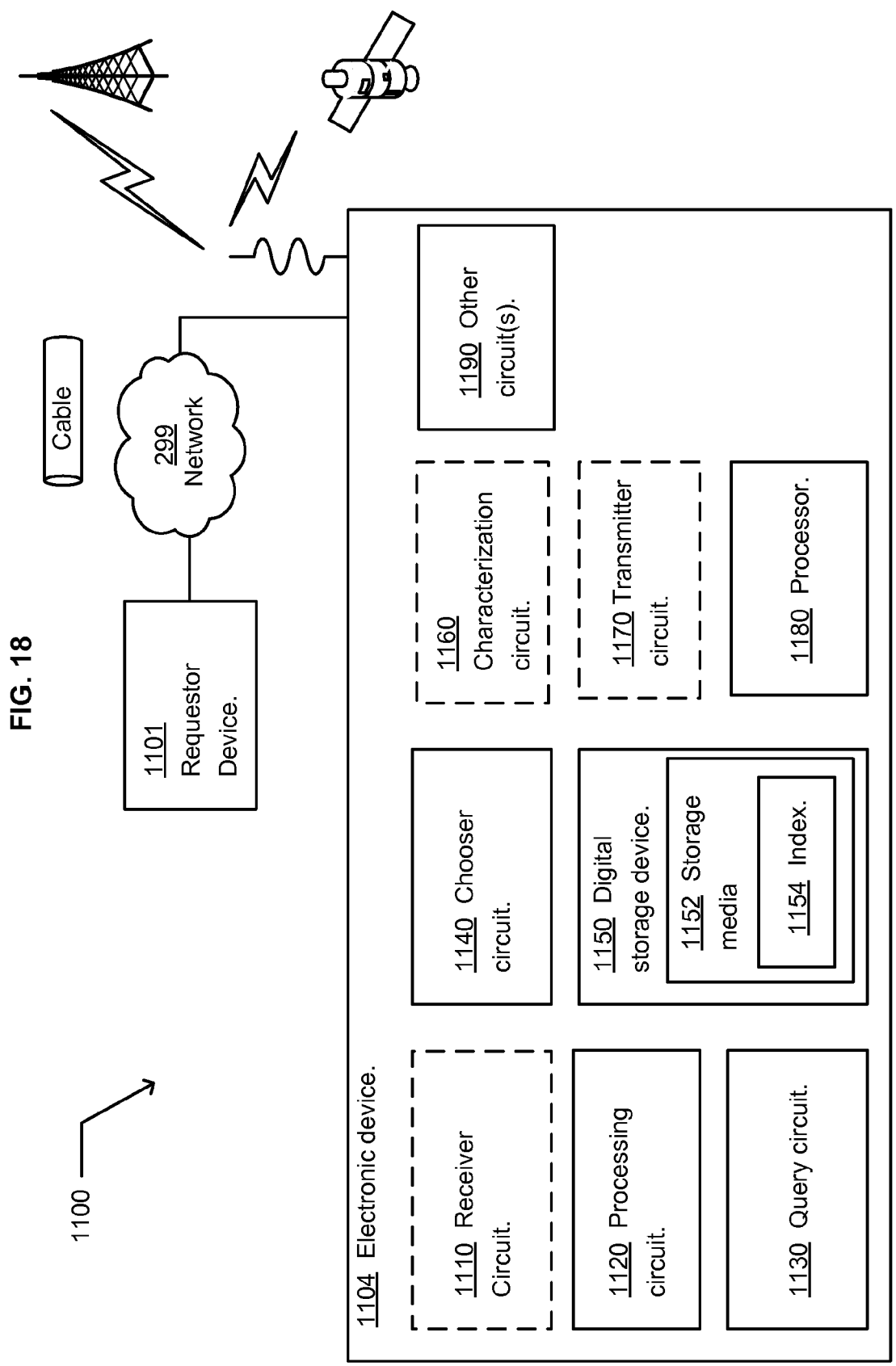

FIG. 19

1210 Computer-readable medium bearing the program instructions.

1220 Program instructions operable to perform a process in a computing device, the process comprising:

receive sensor data from a requestor indicative of a response by a person to a viewed first content;

analyze the received sensor data for an indication of an expression by the person corresponding to the viewed first content;

facilitate a search of an index for a second content using a search parameter corresponding to the indicated expression and a content attribute of the viewed first content; and return to the requestor an indication of the second content.

1222 Select the second content from a result of the search for a second content.

1224 Save data indicative of the selected second content.

1212 Computer storage medium.

1305 Electronic device.

1310 Means for receiving data from a requestor indicative of a sensed response by a person to a first content displayed to the person.

1320 Means for analyzing the received data for an indication of an expression by the person corresponding to the first content.

1330 Means for facilitating a search for a second content using a search parameter corresponding to the indication of an expression by the person and a content attribute of the displayed first content.

1340 Means for returning to the requestor an indication of the second content.

1350 Means for receiving an indication of a content attribute of the displayed first content.

1360 Means for determining a content attribute of the displayed first content.

METHOD OF SELECTING A SECOND CONTENT BASED ON A USER'S REACTION TO A FIRST CONTENT

SUMMARY

An embodiment provides a method implemented in an environment that includes a person viewing content displayed by an electronic device. The method includes detecting a reaction by the person to a displayed first content. The method also includes determining a content attribute of the displayed first content. The method further includes facilitating a search for a second content based on the detected reaction and on the determined content attribute. The method includes displaying the second content in a manner perceivable by the person. The method may include displaying the first content in a manner perceivable by the person. The method may include selecting the second content from a result of the facilitated search. The method may further include maintaining informational data corresponding to the second content. In addition to the foregoing, other method embodiments are described in the claims, drawings, and text that form a part of the present application.

Another embodiment provides a system. The system includes a display surface operable to display electronic content in a manner perceivable by a person. The system also includes a sensor apparatus operable to acquire data indicative of a response by the person to a first electronic content displayed on the surface. The system further includes an analytic circuit operable to determine an indication of an expression by the person corresponding with the displayed first electronic content. The determination is based on the data indicative of a response. The system also includes a characterization circuit operable to determine an attribute of the displayed first electronic content. The system includes a query circuit operable to cause a search for a second electronic content corresponding to the indication of expression and to the attribute of the first electronic content. The system further includes a chooser circuit operable to select the second electronic content from a result of the search. The system may include a digital storage device operable to save the selected second electronic content. The system may include a broadcast circuit operable to facilitate a display of the first electronic content and the selected second electronic content. The system may further include a receiver circuit operable to receive a result of the initiated search. In addition to the foregoing, other system embodiments are described in the claims, drawings, and text that form a part of the present application.

A further embodiment provides a computer program product. The computer program product includes a computer-readable computer storage medium bearing the program instructions. The computer program product also includes the program instructions which are operable to perform a process in a computing device. The process includes detect a reaction by a person to a displayed first content. The process also includes determine a content attribute of the displayed first content. The process further includes facilitate a search for a second content based on the detected reaction and on the determined content attribute. The process also includes select the second content from a result of the facilitated search. The process further includes save data indicative of the selected second content. In addition to the foregoing, other computer program embodiments are described in the claims, drawings, and text that form a part of the present application.

An embodiment provides an electronic device. The electronic device includes means for detecting a reaction by a person to a displayed first content. The electronic device also includes means for determining a content attribute of the displayed first content. The electronic device further includes means for facilitating a search for a second content based on the detected reaction and on the determined content attribute. The electronic device also includes means for displaying the second content in a manner perceivable by the person. In addition to the foregoing, other electronic device embodiments are described in the claims, drawings, and text that form a part of the present application.

Another embodiment provides a method implemented in an environment that includes a person viewing content displayed by an electronic device. The method includes detecting a reaction by the person to a displayed first content. The method also includes transmitting a search request for a second content corresponding to the detected reaction and to an attribute of the displayed first content. The method further includes receiving a response to the search request that includes at least an indication of the second content. The method also includes displaying the second content. In an alternative embodiment, the method may include determining a content attribute of the displayed first content. The method may include selecting the second content from the response to the search request. In addition to the foregoing, other method embodiments are described in the claims, drawings, and text that form a part of the present application.

A further embodiment provides an electronic device. The electronic device includes a display surface, a sensor apparatus, an analytic circuit, a query circuit, and a receiver circuit. The display surface is operable to display electronic content in a manner perceivable by a person. The sensor apparatus is operable to acquire data indicative of a response by the person to a first electronic content displayed on the surface. The analytic circuit is operable to detect a reaction by the person to a displayed first content in response to the acquired data. The query circuit is operable to transmit a search request for a second electronic content that corresponds to the detected reaction and to an attribute of the displayed first content. The receiver circuit is operable to receive a response to the search request that includes at least an indication of the second content. In an alternative embodiment, the electronic device may include a chooser circuit operable to select the second electronic content from the received response to the search request. The electronic device may include a broadcast circuit operable to facilitate a display of the first electronic content and the second electronic content. The electronic device may include a receiver circuit operable to receive a result of the initiated search. The electronic device may include a digital storage device operable to save the received response to the search request. In addition to the foregoing, other electronic device embodiments are described in the claims, drawings, and text that form a part of the present application.

An embodiment provides a computer program product. The computer program product includes a computer-readable medium bearing program instructions. The program instructions are operable to perform a process in a computing device. The process including includes receive sensor data from a requestor indicative of a response by a person to a viewed first content. The process also includes analyze the received sensor data for an indication of an expression by the person corresponding to the viewed first content. The process further includes facilitate a search of an index for a second content using a search parameter corresponding to the indicated expression and to a content attribute of the viewed first content. The process also includes return to the requestor an indication of the second content. The computer-readable medium may include a computer storage medium. In addition to the foregoing, other computer program embodiments are described in the claims, drawings, and text that form a part of the present application.

Another embodiment provides a method. The method includes receiving from a requester sensor data indicative of a response by a person to a first content displayed to the person. The method also includes analyzing the received sensor data for an indication of an expression by the person corresponding to the first content. The method further includes facilitating a search for a second content using a search parameter corresponding to the indication of an expression by the person and to a content attribute of the displayed first content. The method also includes returning to the requestor an indication of the second content. The method may include determining a content attribute of the displayed first content. In addition to the foregoing, other method embodiments are described in the claims, drawings, and text that form a part of the present application.

A further embodiment provides an electronic device. The electronic device includes a processing circuit, a query circuit, a chooser circuit, and a storage device. The processing circuit is operable to analyze received sensor data for an indication of an expression by a person corresponding to a first displayed electronic content. The query circuit is operable to cause a search for a second electronic content based on the indication of expression and on an attribute of the displayed first electronic content. The chooser circuit is operable to select the second electronic content from a result of the search for a second electronic content. The storage device is operable to save an indication of the selected second electronic content. The electronic device may include a characterization circuit operable to determine the attribute of the displayed first electronic content. The electronic device may include a transmitter circuit operable to send an indication of the selected second electronic content addressed to the requestor. The electronic device may include a receiver circuit operable to receive from a requester sensor data acquired from the person and indicative of a response by the person to a display of a first electronic content. In addition to the foregoing, other device embodiments are described in the claims, drawings, and text that form a part of the present application.

An embodiment provides a computer program product. The computer program product includes a computer-readable medium bearing program instructions. The program instructions are operable to perform a process in a computing device. The process includes receive sensor data from a requestor indicative of a response by a person to a viewed first content. The process also includes analyze the received sensor data for an indication of an expression by the person corresponding to the viewed first content. The process further includes facilitate a search of an index for a second content using a search parameter corresponding to the indicated expression and to a content attribute of the viewed first content. The process also includes return to the requestor an indication of the second content. The computer-readable medium may include a computer storage medium. In addition to the foregoing, other computer program embodiments are described in the claims, drawings, and text that form a part of the present application.

Another embodiment provides an electronic device. The electronic device includes means for receiving data from a requestor indicative of a sensed response by a person to a first content displayed to the person. The electronic device also includes means for analyzing the received data for an indication of an expression by the person corresponding to the first content. The electronic device further includes means for facilitating a search for a second content using a search parameter corresponding to the indication of an expression by the person and to a content attribute of the displayed first content. The electronic device also includes means for returning to the requestor an indication of the second content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 illustrates an alternative embodiment of the operational flow of FIG. 4;

FIG. 9 illustrates another alternative embodiment of the operational flow of FIG. 4;

FIG. 11 illustrates an example computer program product;

FIG. 12 illustrates an example environment that includes an electronic device;

FIG. 13 illustrates an example operational flow implemented in an environment that includes a person viewing content displayed by an electronic device;

FIG. 14 illustrates an example computer program product;

FIG. 16 illustrates an example operational flow;

FIG. 17 illustrates another alternative embodiment of the operational flow of FIG. 16;

FIG. 18 illustrates an example system;

FIG. 19 illustrates an example computer program product; and

FIG. 20 illustrates an example system that includes an electronic device.

DETAILED DESCRIPTION

Figure 1:
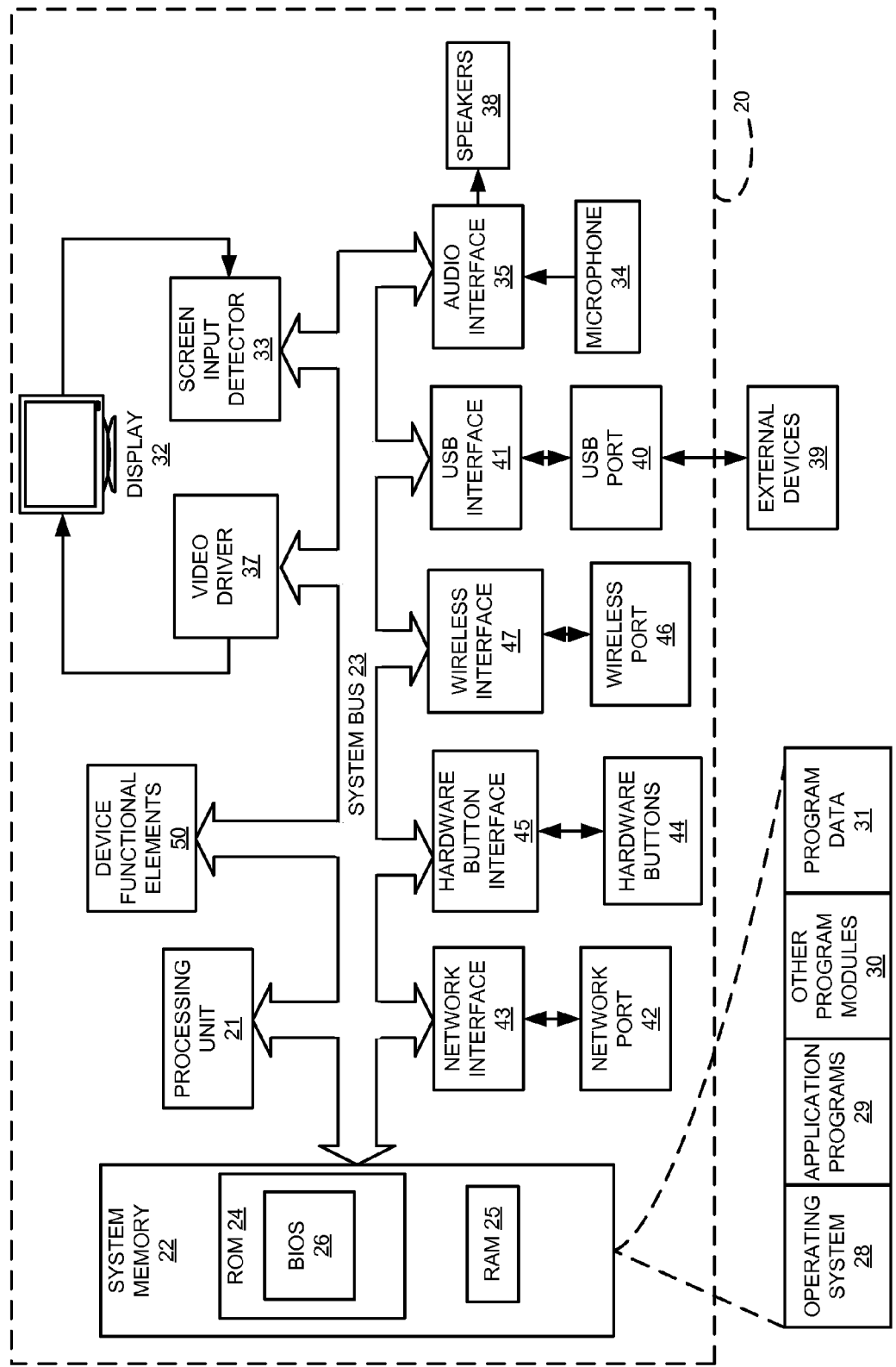
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, a wireless communication device, a mobile wireless communication device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47, to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
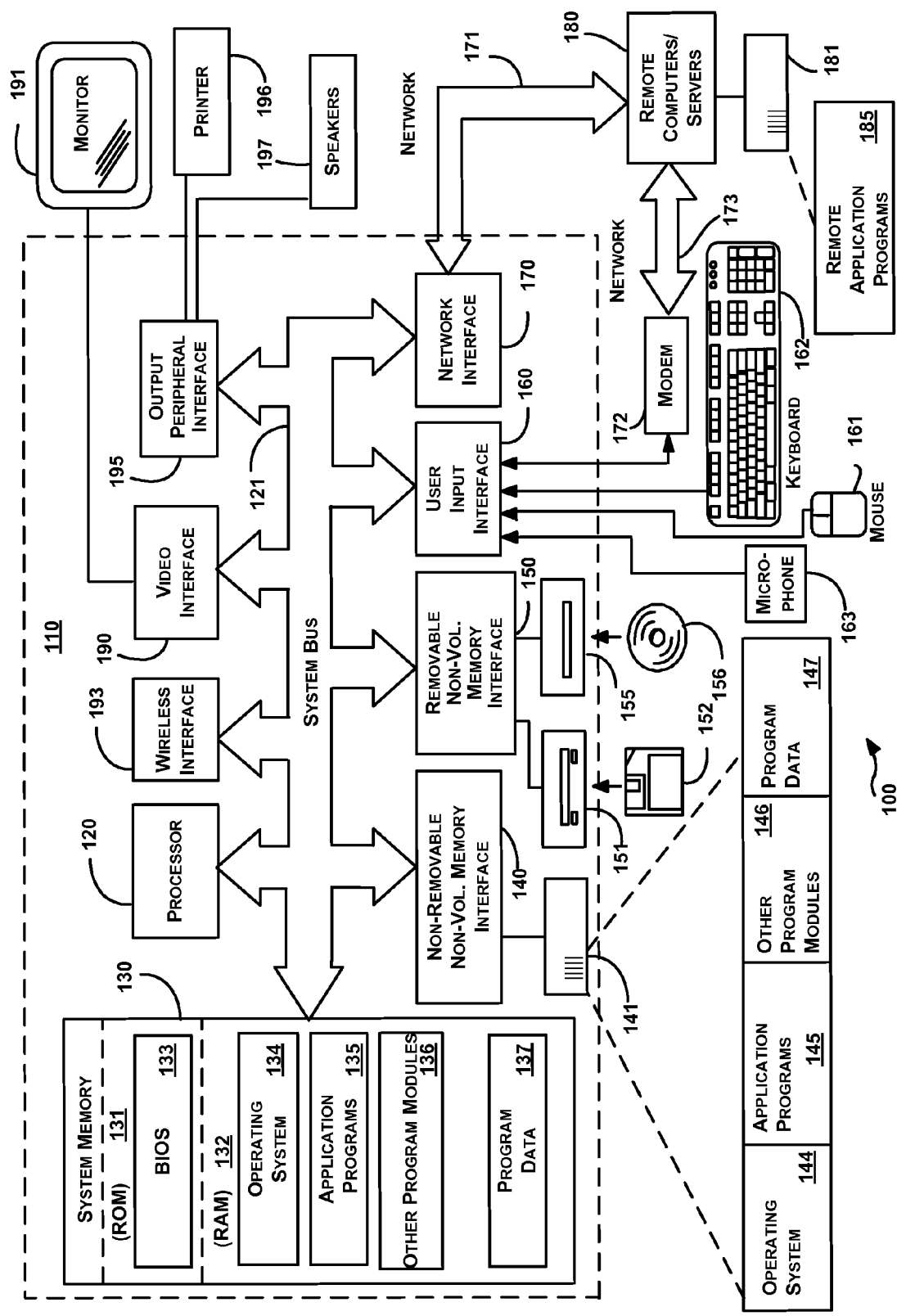
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, and/or the wireless interface 193. The network may include a LAN network environment, and/or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications links between the computers may be used.

Figure 3:
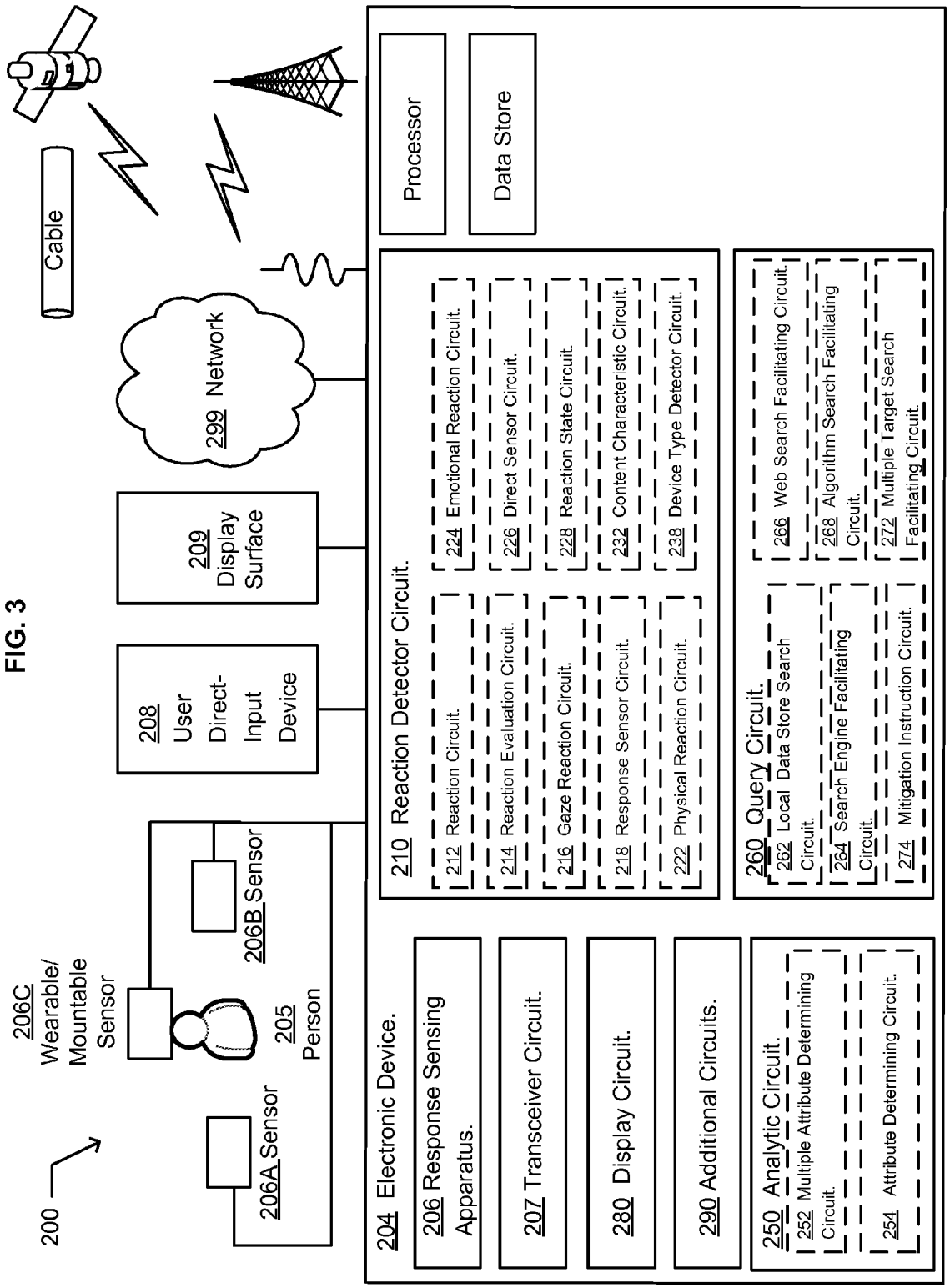
FIG. 3 illustrates an exemplary system in which embodiments may be implemented.

FIG. 3 illustrates an example environment 200 in which embodiments may be implemented. The example environment includes an electronic device 204, a response sensing apparatus 206, a transceiver circuit 207, a user direct-input device 208, and a display surface 209. In some embodiments, one or more of the response sensing apparatus, the transceiver circuit, the user direct-input interface, and the display surface may be structurally distinct from the remaining circuits or the electronic device, or may be at least partially physically incorporated with the electronic device. The response sensing apparatus includes at least one user sensor operable to acquire data indicative of a response by a person 205 to a content displayed by or on the display surface. The at least one user sensor is illustrated as a sensor 206A, a sensor 206B, and a wearable/mountable sensor 206C. The at least one user sensor may be physically incorporated with the electronic device, or may be physically separate from the electronic device and electronically coupled with the device. The at least one user sensor physically incorporated with the electronic device may be a wearable/mountable sensor at least partially physically incorporated with the electronic device such that the electronic device including the user sensor is a wearable/mountable electronic device including the user sensor. The user direct-input device 208 includes at least one device that may be used by the person to directly interact with the electronic device, such as the mouse 161, keyboard 162, microphone 163, and/or speakers 197 described in conjunction with FIG. 2, or a touch screen, such as the display 32 combined with the screen input detector 33 described in conjunction with FIG. 1. The display surface may include any surface suitable for displaying a content to the person. The display surface may include the monitor 191 described in conjunction with FIG. 2, or a surface such as a wall or another planar surface (not shown) onto which a content may be projected for display to the person. The display surface may be physically incorporated with the electronic device, or may be physically separate from the electronic device and electronically coupled with the device.

The electronic device 204 may include a wired or wireless access to digital content using the transceiver 207, such as via a network 299. In an alternative embodiment, the electronic device may be coupled to the network via a wireless link, a satellite link, and/or a wired link. In yet a different embodiment, the electronic device as a wearable/mountable electronic device, including a frame configured to be worn by a user in a manner similar to a pair of eyeglasses, at least partially incorporates the transceiver in the frame.

In an embodiment, the electronic device 204 includes a reaction detector circuit 210, an analytic circuit 250, a query circuit 260, and a display circuit 280. In some embodiments, one or more of the reaction detector circuit, the analytic circuit, the query circuit, and/or the display circuit may be structurally distinct from the remaining circuits. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The person 205 may input commands and information to the electronic device 204 using the user direct-input device 208.

The electronic device 204 may include at least one additional circuit. The at least one additional circuit may include additional circuits 290. In addition, the electronic device may include a processor (not illustrated), such as the processing unit 21 described in conjunction with FIG. 1, and/or the processor 120 described in conjunction with FIG. 2. In further addition, the electronic device may include a computer storage media illustrated as a data store. In an embodiment, the electronic device 204 may include a mobile electronic device.

In an embodiment, the reaction detector circuit 210 may include at least one additional circuit. The at least one additional circuit may include at least one of a reaction circuit 212, reaction evaluation circuit 214, a gaze reaction circuit 216, a response sensor circuit 218, a physical reaction circuit 222, an emotional reaction circuit 224, a direct sensor circuit 226, a reaction state circuit 228, a content characteristic circuit 232, and/or a device type detector circuit 238.

In another embodiment, the analytic circuit 250 may include at least one additional circuit. The at least one additional circuit may include at least one of a multiple attribute determining circuit 252 and/or an attribute determining circuit 254.

In a further embodiment, the query circuit 260 may include at least one additional circuit. The at least one additional circuit may include at least one of a local data store search circuit 262, a search engine facilitating circuit 264, a mitigation instruction circuit 274, a Web search facilitating circuit 266, an algorithm search facilitating circuit 268, and/or a multiple target search facilitating circuit 272.

Figure 4:
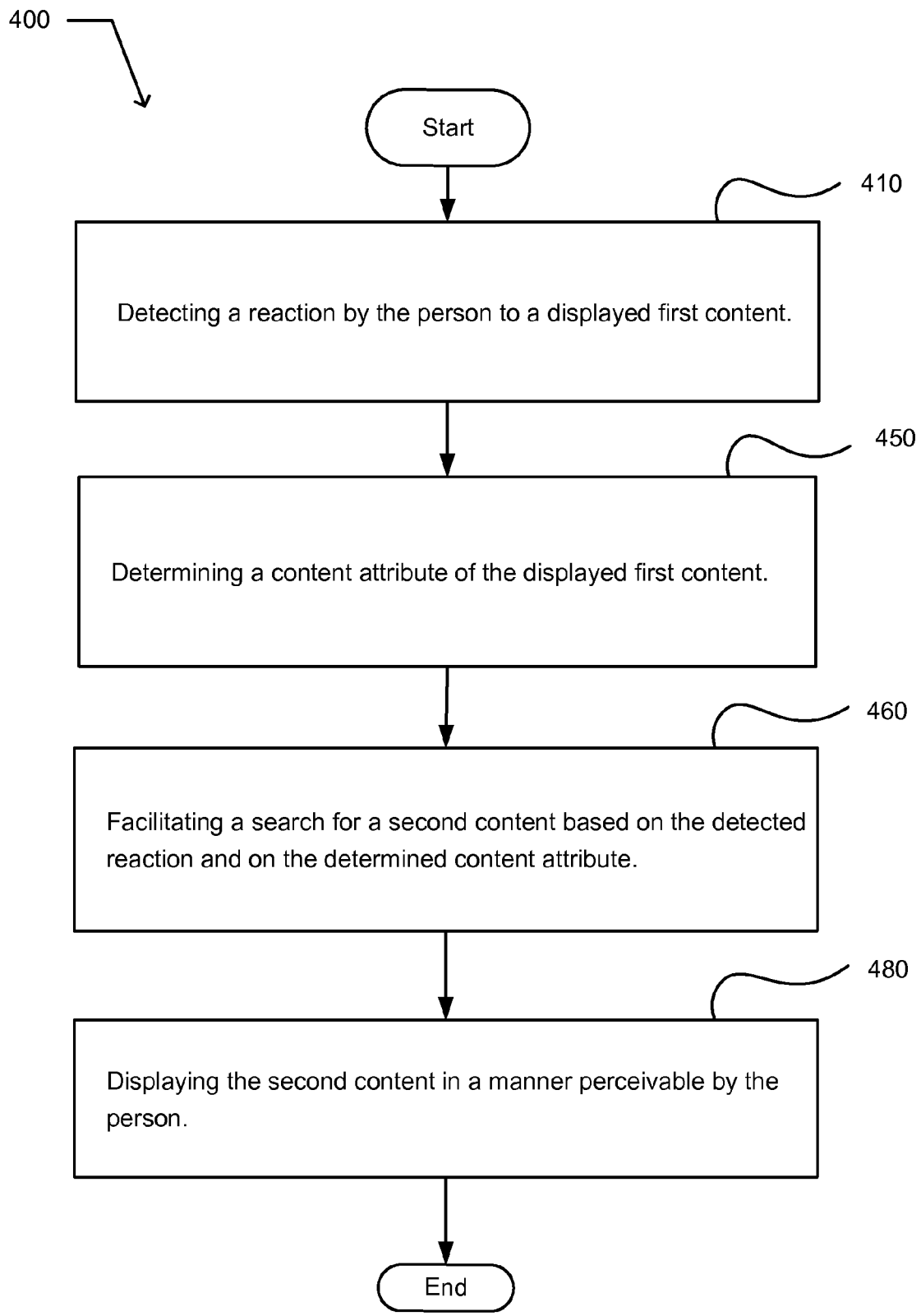
FIG. 4 illustrates an example of an operational flow implemented in an environment that includes a person interacting with an electronic device using a user direct-input device.

FIG. 4 illustrates an example of an operational flow 400 implemented in an environment that includes a person interacting with an electronic device using a user direct-input device. In an alternative embodiment, the environment that includes a person interacting with an electronic device using a user direct-input device further includes an environment that includes a person viewing content displayed by an electronic device and directly interacting with the electronic device using a user direct-input device. FIG. 4 and several following figures may include various examples of operational flows, discussions, and explanations with respect to the above-described environment 200 of FIG. 3, and/or with respect to other examples and contexts. However, it should be understood that the operational flows may be executed in a number of other environments and contexts, and/or in modified versions of FIG. 3. Also, although the various operational flows are illustrated in a sequence(s), it should be understood that the various operations may be performed in other orders than those which are illustrated, and/or may be performed concurrently.

After a start operation implemented in the environment that includes a person viewing content displayed by an electronic device using a user direct-input device, the operational flow 400 includes an observation operation 410. The observation operation detects a reaction by the person to a displayed first content. The observation operation may be implemented using the reaction detector circuit 210, and/or the response sensing apparatus 206. An analytical operation 450 determines a content attribute of the displayed first content. The analytical operation may be implemented using the analytic circuit 250. A query operation 460 facilitates a search for a second content based on the detected reaction by the observation operation and on the determined content attribute by the investigation operation. The query operation may be implemented using the query circuit 260. A broadcast operation 480 displays the second content in a manner perceivable by the person. The broadcast operation may be implemented using the display circuit 280. The operational flow 400 then proceeds to an end operation.

In an embodiment, the observation operation 410 may be implemented using the reaction detector circuit 210 of FIG. 3. For example, optically based observation data of the person 205 may be acquired by the sensor 206A, and/or sensor 206B. Physiological based data of the person may be acquired by the wearable/mountable sensor 206C. A circuit in the response sensing apparatus 206 may transform data acquired by the sensors 206A-206C into data indicative of a response by the person to the displayed first content. For example, a response may include at least one of a change in breathing rate, a change in heart rate, eye movements, facial movements, gaze direction and/or time, or a brain wave pattern. Another circuit in the response sensing circuit may detect a reaction by the person to a displayed first content based on the data indicative of a response by the person to the displayed first content. For example, a facial response that includes the person moving the ends of their lips above the center portion of the lips may be detected as a "smile" reaction or a "positive" reaction. A facial response that includes the person moving the ends of the lips below the center portion of the lips may be detected as a "frown" reaction or a "negative" reaction. The observation operation does not include data directly inputted by the person 205 using the user direct-input device 208, such as keyboard, mouse, and voice commands entered by the user through the user direct-input device. However, in an alternative embodiment, the observation operation may include at least one of a quality, or a manner of the person's input of data using the direct-input device. For example, the observation operation may acquire data indicative of the person shouting a voice command without regard to a nature of the voice command, or the person striking keys of the keyboard particularly hard without regard to the keyed command or text. In a further embodiment, the observation operation may acquire sensor data indicative of the person shouting a voice command and associate a reaction with the nature of the voice command. For example, data indicative of a loud voice response may be associated with a spoken command "Delete this Web page" as a negative reaction to the content of the Web page.

In an embodiment, data indicative of a response may include data indicative of at least one of a person's gaze, attention, gaze dwell time, facial movements, eye movements, pupil dilation, physiological parameters (heart rate, respiration rate, etc.), stance, sub-vocalization (and other non-word audio), P-300 response, brain waves, brain patterns, or other detectable aspects. In another embodiment, data indicative of a response may include data indicative of at least one of a person's physiological, behavioral, emotional, voluntary, or involuntary response. In a further embodiment, data indicative of a response may include data acquired by functional near-infrared spectroscopy (fNIRS) indicative of a response. fNIRS data may be acquired by a fNIRS device, an embodiment of which is illustrated as the wearable/mountable sensor 206C.

In another embodiment, the observation operation 410 detects a reaction by the person to a displayed first content by applying pattern recognition to the data indicative of a response by the person to the displayed first content. For example, a reaction may include a response that reveals the person 205's feelings or attitude toward the displayed first content. In a further embodiment, the observation operation detects a reaction by the person to a displayed first content by applying pattern matching to the data indicative of a response by the person to the displayed first content.

In use, an embodiment of the operational flow 400 may be illustrated by reference to FIG. 3. For example, a first content may be displayed to the person 205 on a portion of the display surface 209, such as a screen of a BlackBerry® or other PDA electronic device. In this example, the displayed first content may be a picture of a new car from a brother of the person 205. Data indicative of a response by the person 205 to the displayed new car is acquired using at least one of sensors 206A-206C. The observation operation 410 determines a reaction by the person to the displayed new car based on the data indicative of a response. If, for example, the data indicates an upward movement of the ends of the person's lips and an opening of their eyes, a positive reaction may be detected. The analytical operation 450 determines a content attribute of the displayed picture of the brother's new car. A content attribute may include at least one of a manufacturer of the new car, a color of the new car, or a body style of the new car, such as a convertible, coupe, four-door, or SUV. The query operation 460 facilitates a search for a second content based on the detected reaction (positive) and on the determined content attribute (convertible sports car). The search may be facilitated by communicating with an Internet based search service, such as Google, Yahoo, and/or Live Search. The broadcast operation 480 displays a second content in a manner perceivable by the person by receiving a result of the facilitated search that includes an indication of the second content, and displaying the second content using the display surface 209. For example, the second content may include a picture of next year's model of the same car as the brother's new car.

Figure 5:
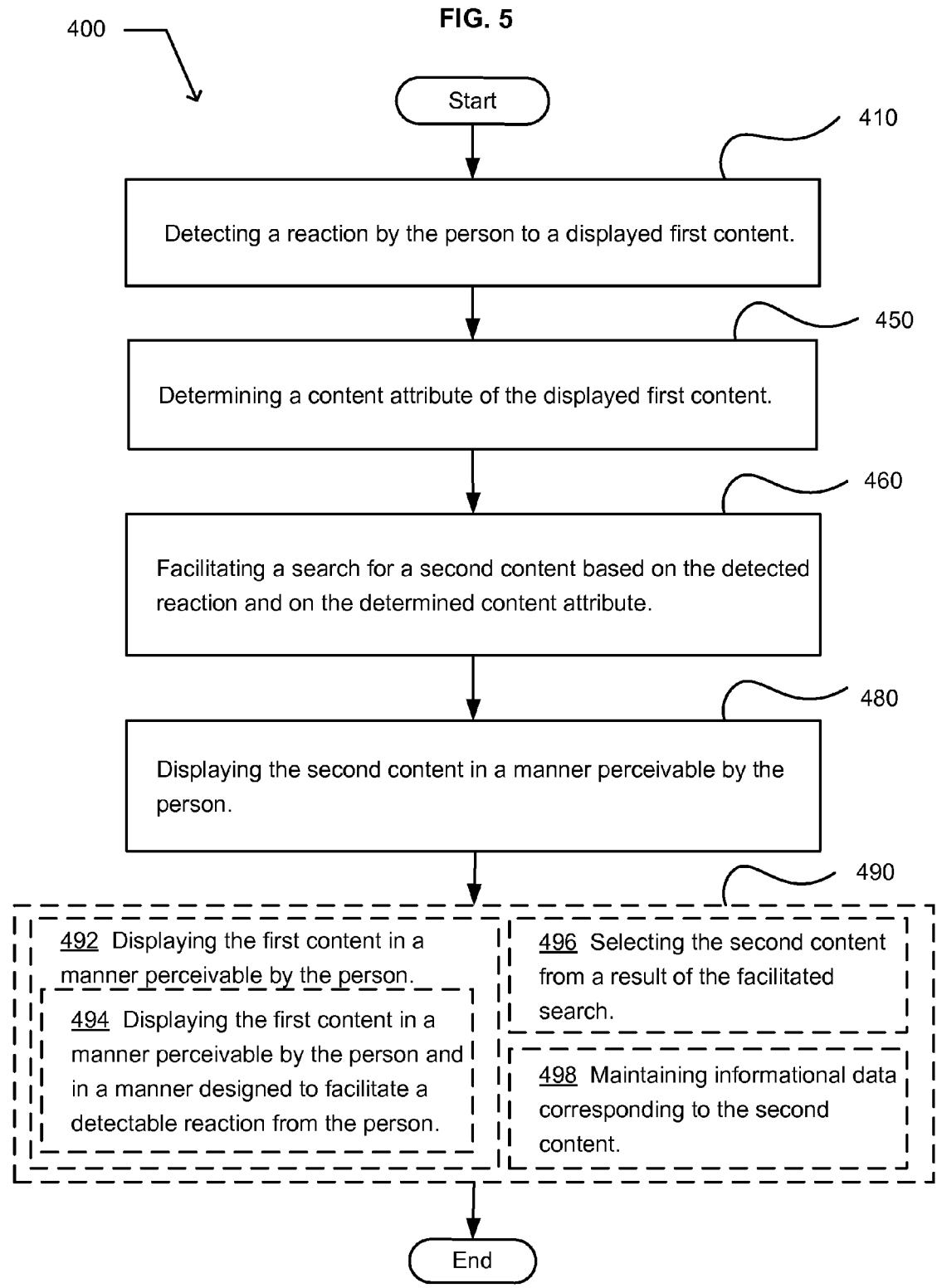
FIG. 5 illustrates an alternative embodiment of the operational flow of FIG. 4.

FIG. 5 illustrates an alternative embodiment of the operational flow 400 of FIG. 4. The operational flow may include an additional operation 490. The additional operation may include at least one of an operation 492, an operation 494, an operation 496, or an operation 498. The operation 492 displays the first content in a manner perceivable by the person. The operation 492 may include at least one additional operation, such as the operation 494. The operation 494 displays the first content in a manner perceivable by the person and in a manner designed to facilitate a detectable reaction from the person. The operation 496 selects the second content from a result of the facilitated search. In an embodiment, the second content may be selected in response to an algorithm that includes a machine learning aspect. In an alternative embodiment, the selection algorithm may include a pattern recognition algorithm. The operation 498 maintains informational data corresponding to the second content. The operation 490 may be implemented using at least one circuit of the additional circuits 290 of FIG. 3.

Figure 6:
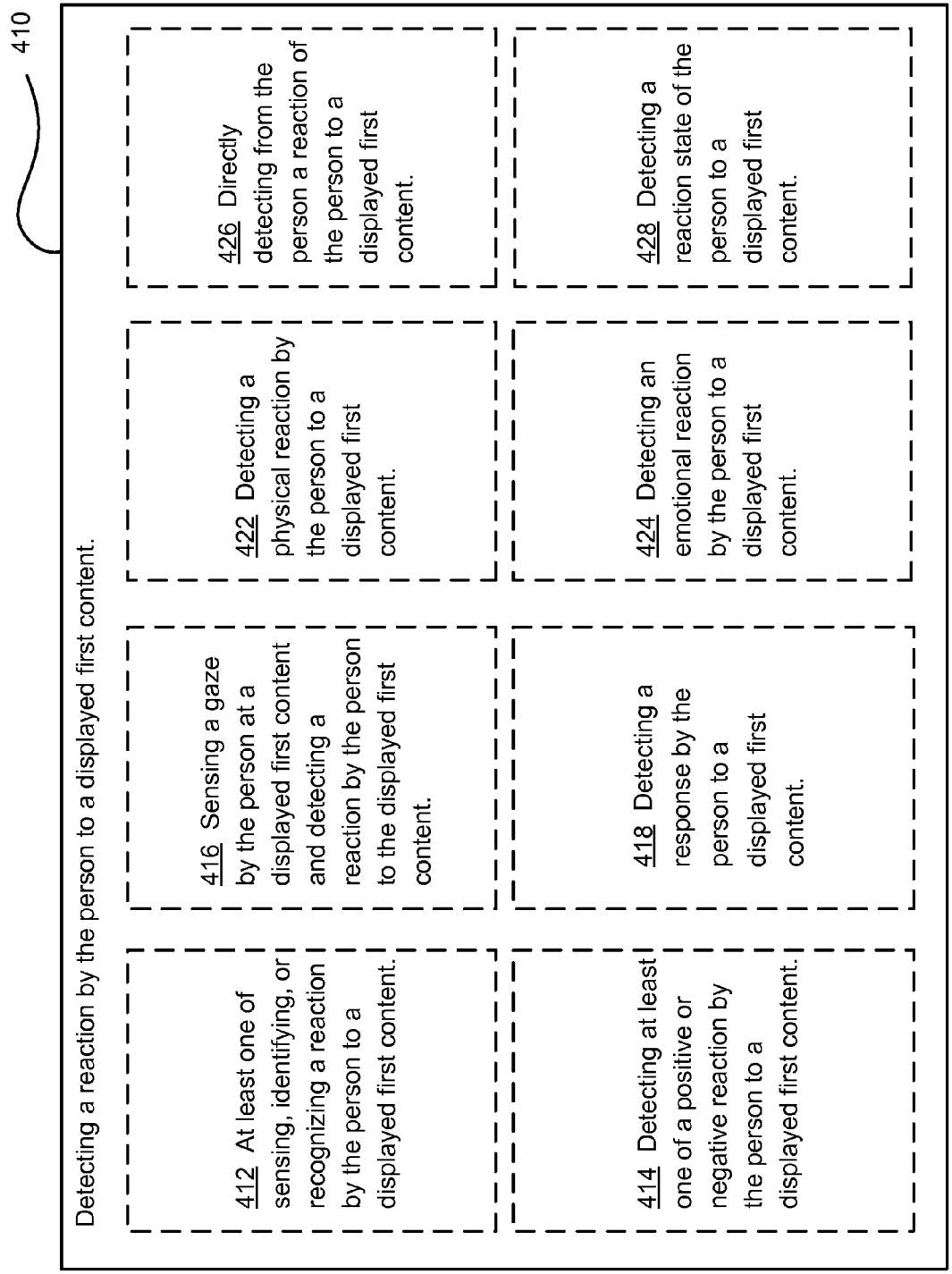
FIG. 6 illustrates another alternative embodiment of the operational flow of FIG. 4.

FIG. 6 illustrates another alternative embodiment of the operational flow 400 of FIG. 4. The observation operation 410 may include at least one additional operation. The at least one additional operation may include an operation 412, an operation 414, an operation 416, an operation 418, an operation 422, an operation 424, an operation 426, or an operation 428. The operation 412 includes at least one of sensing, identifying, or recognizing a reaction by the person to a displayed first content. The operation 412 may be implemented using the reaction circuit 212 of FIG. 3. The operation 414 includes detecting at least one of a positive or negative reaction by the person to a displayed first content. The operation 414 may be implemented using the reaction evaluation circuit 214. The operation 416 includes sensing a gaze by the person at a displayed first content and detecting a reaction by the person to the displayed first content. The operation 416 may be implemented using the gaze reaction circuit 216. The operation 418 includes detecting a response by the person to a displayed first content. The operation 418 may be implemented using the response sensor circuit 218. The operation 422 includes detecting a physical reaction by the person to a displayed first content. The operation 422 may be implemented using the physical reaction circuit 222. The operation 424 includes detecting an emotional reaction by the person to a displayed first content. The operation 424 may be implemented using the emotional reaction circuit 224. The operation 426 includes directly detecting from the person a response of the person to a displayed first content. The operation 426 may be implemented using the direct sensor circuit 226. The operation 428 includes detecting a reaction state of the person to a displayed first content. The operation 428 may be implemented using the reaction state sensor circuit 228.

Figure 7:
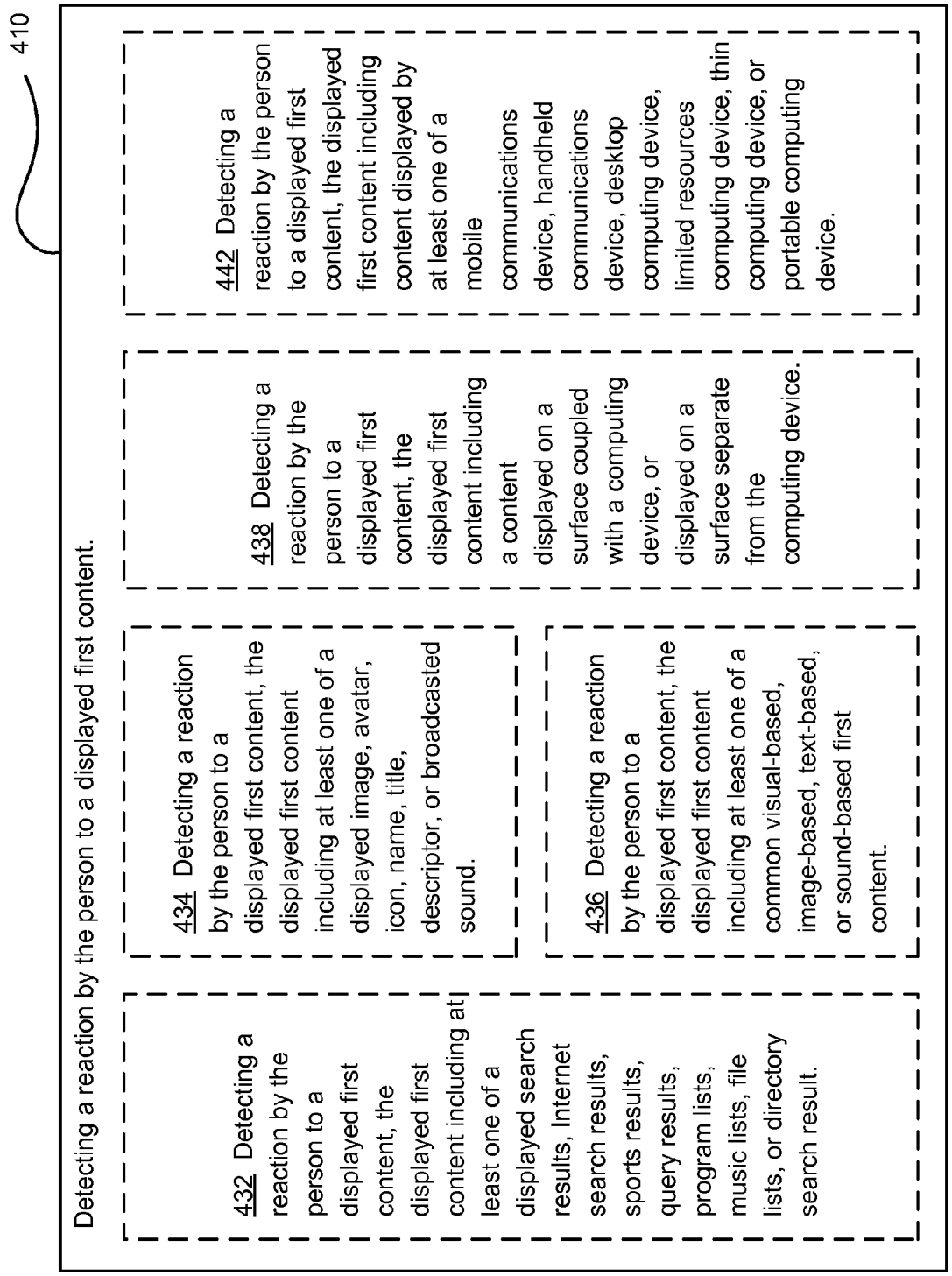
FIG. 7 illustrates a further alternative embodiment of the operational flow of FIG. 4.

FIG. 7 illustrates a further alternative embodiment of the operational flow 400 of FIG. 4. The observation operation 410 may include at least one additional operation. The at least one additional operation may include an operation 432, an operation 434, an operation 436, an operation 438, or an operation 442. The operation 432 includes detecting a reaction by the person to a displayed first content. The displayed first content includes at least one of a displayed search result or Internet search results, such as from a search provider such as Google, Yahoo, or Live Search. Alternatively, the displayed first content may include sports scores, or news. For example, the displayed search results may include a displayed result of a restaurant search, a movie search, or car repair shops. In further alternative, the displayed first content may include a program list, a music list, a file list, or directory search result of locally stored files. The operation 434 includes detecting a reaction by the person to a displayed first content. The displayed first content includes at least one of a displayed image, avatar, icon, name, title, descriptor, or broadcasted sound. For example, a title may include a song title, a book title, or a movie title. The operation 436 includes detecting a reaction by the person to a displayed first content. The displayed first content includes at least one of a visual-based, image-based, text-based, or sound-based content. The operations 432, 434, and/or 436 may be implemented using the content characteristic circuit 232.

The operation 438 includes detecting a reaction by the person to a displayed first content. The displayed first content includes a content displayed on a surface coupled with a computing device, such as a built-in screen of the computing device or a screen physically coupled with the computing device, or displayed on a surface separate from the computing device, such as projected onto a separate screen or a wall surface. The operation 442 includes detecting a reaction by the person to a displayed first content. The displayed first content includes a content displayed by at least one of a mobile communications device, handheld communications device, desktop computing device, limited resources computing device, thin computing device, or portable computing device. The operations 438 and/or 442 may be implemented using the device type detector circuit.

FIG. 8 illustrates an alternative embodiment of the operational flow 400 of FIG. 4. The analytical operation 450 may include at least one additional operation. The at least one additional operation may include an operation 452, or an operation 454. The operation 452 includes determining at least two content attributes of the displayed first content. The operation 452 may be implemented using the multiple attribute determining circuit 252. The operation 454 includes determining a content attribute of the displayed first content. The determined content attribute may include at least one of a category, tag, subject, color, texture, or theme attribute of the displayed first content. For example, a theme attribute may include a sunset, famous athlete, convict, dog, cat, horse, car, airplane, flower, people, inventor, or entertainer attribute. The operation 454 may be implemented using the attribute determining circuit 254.

FIG. 9 illustrates another alternative embodiment of the operational flow 400 of FIG. 4. The query operation 460 may include at least one additional operation. The at least one additional operation may include an operation 462, an operation 464, an operation 466, an operation 468, an operation 472, or an operation 474. The operation 462 includes searching a local data store for a second content based on the detected reaction and on the determined content attribute. In an embodiment, the local data store may include a hard drive having at least one of stored music, or stored video files. The operation 462 may be implemented using the local data store search circuit 262. The operation 464 includes facilitating a search by a search engine for a second content based on the detected reaction and on the determined content attribute. The operation 464 may be implemented using the search engine facilitating circuit 264. The operation 466 includes facilitating a search by a Web search engine for a second content based on the detected reaction and on the determined content attribute. For example, a Web search engine provides the person 205 with tools to search through Web sites, images, videos, news, and a number of other categories. In an embodiment, a Web search engine includes at least one of Google, Yahoo, or Live Search. The operation 466 may be implemented using the Web search facilitating circuit 266. The operation 468 includes facilitating a search for a second content by a search algorithm responsive to the detected reaction and on the determined content attribute. The operation 468 may be implemented using the algorithm search facilitating circuit 268. The operation 472 includes facilitating a search for at least two instances of a second content based on the detected reaction and on the determined content attribute. The operation 472 may be implemented using the multiple target search facilitating circuit 272. The operation 474 includes facilitating a search for a second content based on at least one of a positive correlation, or a negative correlation between the detected reaction and on the determined content attribute. For example, the search may be facilitated based upon a detected positive reaction by the person and on the determined content attribute to locate a second content that is more of the same as the first content. In another example, the search may be facilitated based upon a detected negative reaction by the person and on the determined content attribute to locate a second content that is different from the first content.

Figure 10:
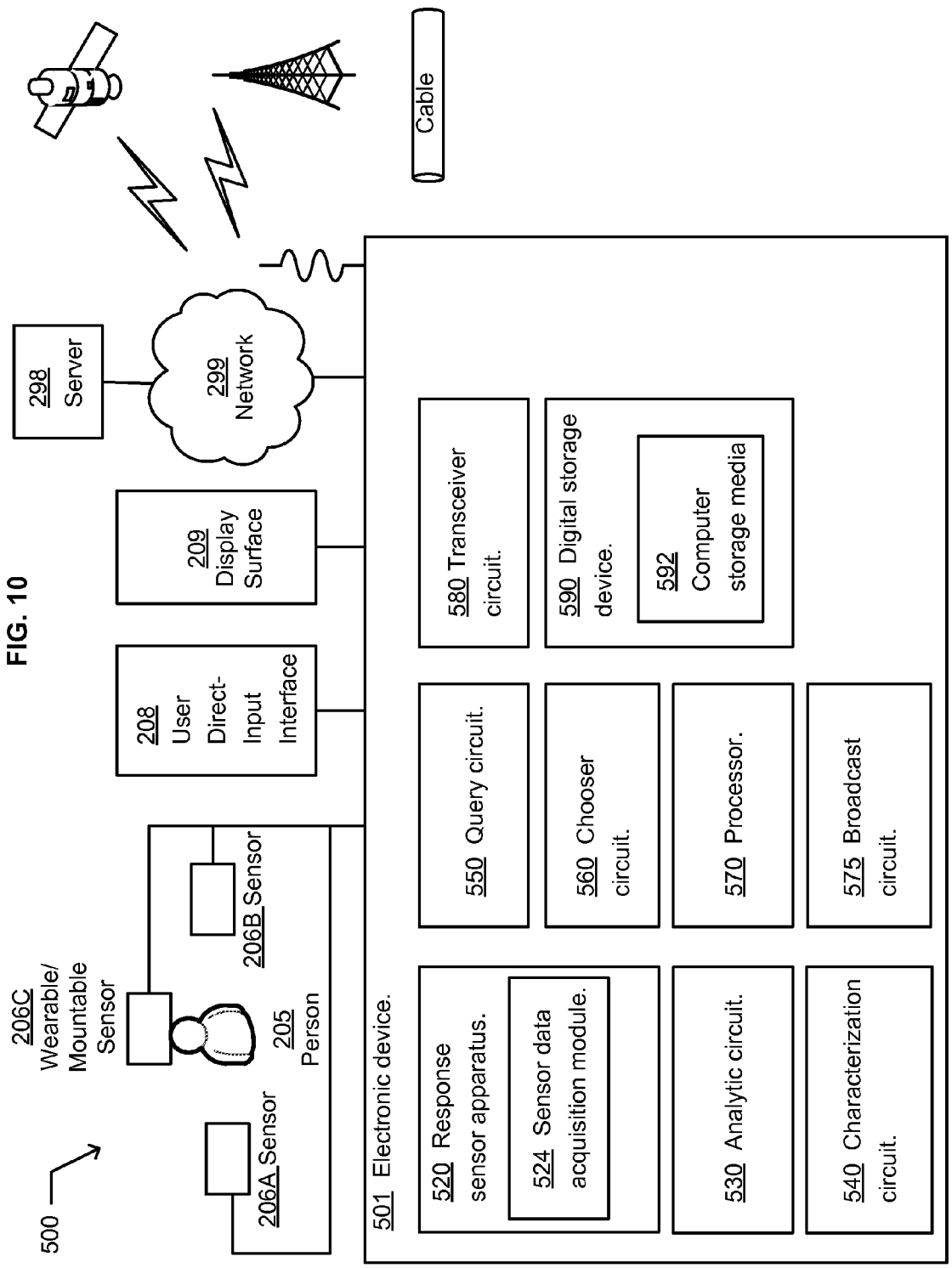
FIG. 10 illustrates an example environment.

FIG. 10 illustrates an example environment 500. The environment includes an electronic device 501 that is couplable to a network 299, and which may be used by a person 205. The electronic device may be coupled to the network via a wired link, illustrated as a cable link, and/or a wireless link illustrated as a satellite link. The electronic device includes the user direct-input device 208, the display surface 209, a response sensor apparatus 520, an analytic circuit 530, a characterization circuit 540, a query circuit 550, and a chooser circuit 560. In an alternative embodiment, the electronic device includes at least one of a portable electronic device, or a mobile electronic device.

The display surface 209 includes a display surface operable to display electronic content in a manner perceivable by a person. In an embodiment, the electronic content includes electronically stored information. In another embodiment, electronically stored content may include electronically stored content as described in Federal Rule of Civil Procedure 26(f). In a further embodiment, electronic content may include at least one of electronically stored text, Web content, picture, image, or streaming image. The response sensor apparatus 520 includes the sensor 206A, the sensor 206B, the wearable/mountable sensor 206C, and a sensor data acquisition module 524. The response sensor apparatus includes a sensor apparatus operable to acquire data indicative of a response by the person 205 to a first electronic content displayed on the surface 209.

The analytic circuit 530 includes an analytic circuit operable to determine an indication of an expression by the person corresponding with the displayed first electronic content, the determination based on the data indicative of a response. In an embodiment, the expression by the person may include at least one of an expression by the person of interest, disinterest, like, dislike, happiness, or anger. The characterization circuit 540 includes a characterization circuit operable to determine an attribute of the displayed first electronic content. The query circuit 550 includes a query circuit operable to cause a search for a second electronic content corresponding to the indication of expression and to the attribute of the first electronic content. The chooser circuit 560 includes a chooser circuit operable to select the second electronic content from a result of the search.

In an alternative embodiment, the electronic device 501 may include a digital storage device 590 operable to save the selected second electronic content. In another embodiment, the electronic device may include a broadcast circuit 575 operable to facilitate a display of at least the first electronic content and the selected second electronic content. In a further embodiment, the electronic device may include a receiver circuit, illustrated as a transceiver circuit 580, operable to receive a result of the initiated search.

In an alternative embodiment, the display surface 209 may include a display surface operable to display electronic content in a manner perceivable by a person 205 and in a manner designed to facilitate sensing a response by the person. In another embodiment, the response sensor apparatus 520 may include a sensor apparatus operable to acquire data indicative of a physically manifested response by the person to a first electronic content displayed on the surface. In a further embodiment, the analytic circuit 530 may include an analytic circuit operable to determine an indication of an emotional expression by the person corresponding with the displayed first electronic content, the determination based on the data indicative of a response.

FIG. 11 illustrates an example computer program product 600. The computer program product includes a computer-readable storage medium 610 bearing program instructions 620. The program instructions are operable to perform a process in a computing device. The process includes detect a reaction by a person to a displayed first content. The process also includes determine a content attribute of the displayed first content. The process further includes facilitate a search for a second content based on the detected reaction and on the determined content attribute. The process also includes select the second content from a result of the facilitated search, and save data indicative of the selected second content. In an alternative embodiment 622, the process may include facilitating a display of the selected second content.

FIG. 12 illustrates an example environment 700 that includes an electronic device 705. The electronic device includes means 710 for detecting a reaction by a person to a displayed first content. The electronic device also includes means 720 for determining a content attribute of the displayed first content. The electronic device further includes means 730 for facilitating a search for a second content based on the detected reaction and on the determined content attribute. The electronic device includes means 740 for displaying the second content in a manner perceivable by the person.

FIG. 13 illustrates an example operational flow 800 implemented in an environment that includes a person viewing content displayed by an electronic device. In an alternative embodiment, the operational flow is 800 implemented in an environment that includes a person viewing content displayed by an electronic device and directly interacting with the electronic device via a user interface. After a start operation, a discovery operation 810 includes detecting a reaction by the person to a displayed first content. In an embodiment, the detected reaction includes at least one of a detected gesture, movement, physiological, or physical reaction. A gesture, movement, physiological, or physical reaction may be at least partially detected via one or more user sensors of the electronic device, including but not limited to one or more sensors at least partially incorporated with a wearable/mountable electronic device, such sensors including one or more position sensors, accelerometers, GPS sensors, or other suitable hardware for detecting position and/or movement. A call operation 820 includes transmitting a search request for a second content corresponding to the detected reaction and to an attribute of the displayed first content. A reception operation 830 includes receiving a response to the search request that includes at least an indication of the second content. A broadcast operation 840 includes displaying the second content. The operational flow the proceeds to an end operation.

In an alternative embodiment, the operational flow may include at least one additional operation 850. The at least one additional operation may include an operation 852, and/or an operation 854. The operation 852 includes determining a content attribute of the displayed first content. The operational flow 854 includes selecting the second content from the response to the search request.

Returning to FIG. 10, an alternative embodiment of the example environment 500 includes the electronic device 501 couplable to a network 299. The display surface 209 includes a display surface operable to display electronic content in a manner perceivable by the person 205. The response sensor apparatus 520 includes a sensor apparatus operable to acquire data indicative of a response by the person to a first electronic content displayed on the surface. The analytic circuit 530 includes an analytic circuit operable to detect a reaction by a person to a displayed first content in response to the acquired data. The query circuit 550 includes a query circuit operable to transmit a search request for a second electronic content that corresponds to the detected reaction and to an attribute of the displayed first content. For example, the search request may be addressed to the server 298 and transmitted over the network 299. The transceiver circuit 580 includes a receiver circuit operable to receive a response to the search request that includes at least an indication of the second content.

In another alternative embodiment, the chooser circuit 560 may include a chooser circuit operable to select the second electronic content from the received response to the search request. In a further embodiment, the broadcast circuit 575 may include a broadcast circuit operable to facilitate a display of the first electronic content and the second electronic content. In another embodiment, the transceiver circuit 580 may include a receiver circuit operable to receive a result of the initiated search. In a further embodiment, the digital storage device 590 may include a digital storage device operable to save the received response to the search request. In another embodiment, the display surface 209 may include a display surface operable to display electronic content in a manner perceivable by the person and in a manner designed to facilitate sensing a response by the person. In a further embodiment, the sensor apparatus 520 may include a sensor apparatus operable to acquire data indicative of a physically manifested response by the person to a first electronic content displayed on the surface.

FIG. 14 illustrates an example computer program product 860. The computer program product includes a computer-readable computer storage medium 862 bearing program instructions 864. The program instructions are operable to perform a process in a computing device. The process includes detect a reaction by a person to a displayed first content. The process also includes transmit a search request for a second content corresponding to the detected reaction and to an attribute of the displayed first content. The process further includes receive a response to the search request that includes at least an indication of the second content. The process also includes save data indicative of the received response to the search request. The process further includes display the second content. In an alternative embodiment, the process may include select the second content from the received response to the search request 866.

Figure 15:
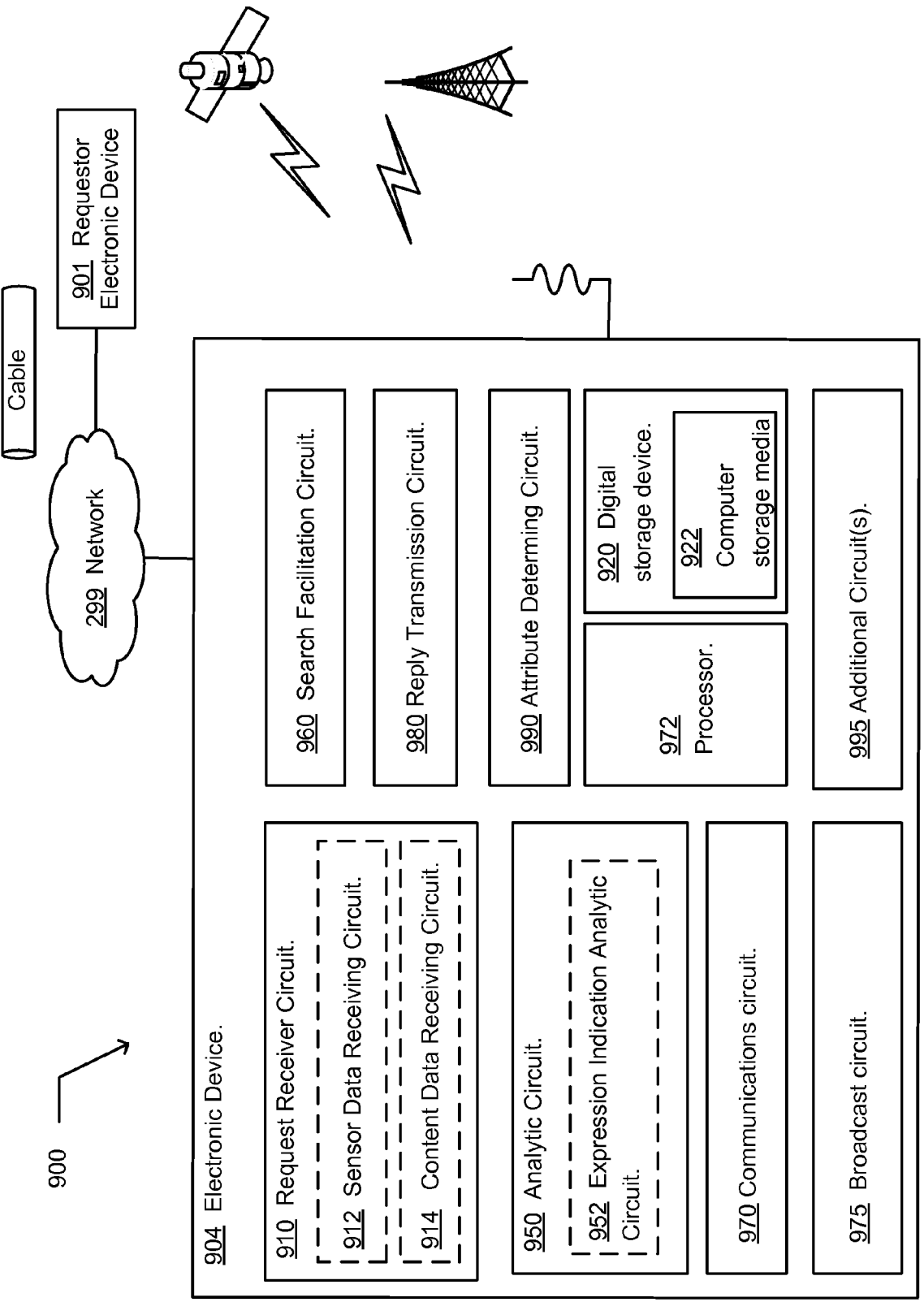
FIG. 15 illustrates an example environment in which embodiments may be implemented.

FIG. 15 illustrates an example environment 900 in which embodiments may be implemented. The example environment includes an electronic device 904 that includes a request receiver circuit 910, an analytic circuit 950, a search facilitation circuit 960, and a reply transmission circuit 980. In some embodiments, one or more of the request receiver circuit, the analytic circuit, the search facilitation circuit, and the reply transmission circuit may be structurally distinct from the remaining circuits or the electronic device. The electronic device 904 may include a wired or wireless access to a requestor electronic device 901 via the network 299 using the communications circuit 970. In an alternative embodiment, the electronic device may be coupled to the network via a wireless link, a satellite link, and/or a wired link. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware.

The electronic device 904 may include at least one additional circuit. The at least one additional circuit may include additional circuit(s) 995. In addition, the electronic device may include a processor 972, such as the processing unit 21 described in conjunction with FIG. 1, and/or the processor 120 described in conjunction with FIG. 2. In further addition, the electronic device may include a digital storage media 920, a communications circuit 970, and/or a broadcast circuit 975. In an embodiment, the electronic device 904 may include a network server electronic device, or a group of network server electronic devices.

In an embodiment, the request receiver circuit 910 may include at least one additional circuit. The at least one additional circuit may include at least one of a sensor data receiving circuit 912, and/or a content data receiving circuit 914. In another embodiment, the analytic circuit 950 may include at least one additional circuit, such as an expression indication analytic circuit 952.

FIG. 16 illustrates an example operational flow 1000. FIG. 16 and several following figures may include various examples of operational flows, discussions, and explanations with respect to the above-described environment 900 of FIG. 15, and/or with respect to other examples and contexts. However, it should be understood that the operational flows may be executed in a number of other environments and contexts, and/or in modified versions of FIG. 15. Also, although the various operational flows are illustrated in a sequence(s), it should be understood that the various operations may be performed in other orders than those which are illustrated, and/or may be performed concurrently.

After a start operation, the operational flow 1000 includes a reception operation 1010. The reception operation includes receiving, from a requester, sensor data indicative of a response by a person to a first content displayed to the person. In an alternative embodiment, the reception operation includes receiving the sensor data from a requestor via at least one of a network, or the Internet. The reception operation may be implemented using the request circuit 910 of FIG. 15. An analysis operation 1050 includes analyzing the received sensor data for an indication of an expression by the person corresponding to the first content. The analysis operation may be implemented using the analytic circuit 950. A query operation 1060 includes facilitating a search for a second content using a search parameter corresponding to the indication of an expression by the person and to a content attribute of the displayed first content. In an alternative embodiment, the search may include at least one of a search of a local data store, a search by a search engine, or a search by a Web search engine. The query operation may be implemented using the search circuit 960. A reply operation 1080 includes returning to the requestor an indication of the second content. The indication of the second content may be returned to the requestor via at least one of a network, or the Internet. The reply operation may be implemented using the reply transmission circuit 980. The operational flow 400 includes an end operation.

In an alternative embodiment, the operational flow 1000 may include at least one additional operation, such as an operation 1090. The operation 1090 includes determining a content attribute of the displayed first content. The operation 1090 may be implemented using the attribute determining circuit 990.

FIG. 17 illustrates another alternative embodiment of the operational flow 1000 of FIG. 16. The reception operation 1010 may include at least one additional operation. The at least one additional operation may include an operation 1012, or an operation 1014. The operation 1012 includes receiving from a requestor at least one of raw sensor data, partially processed sensor data, or processed sensor data indicative of a response by the person to a first content displayed to the person. The operation 1012 may be implemented using the sensor data receiving circuit 912. The operation 1014 includes receiving data indicative of a content attribute of the displayed first content. The operation 1014 may be implemented using content data receiving circuit 914.

The analysis operation 1050 may include at least one additional operation, such as an operation 1052. The operation 1052 includes analyzing the received sensor data for an indication of an expression of at least one of interest, disinterest, like, dislike, excitement, boredom, happy, or anger by the person corresponding to the first content. The operation 1052 may be implemented using the expression indication analytic circuit 952.

FIG. 18 illustrates an example system 1100. The example system includes an electronic device 1104 operable to exchange communications with a requestor device 1101 using the network 299, via for example, a wireless link, a satellite link, and/or a wired link. The electronic device includes a processing circuit 1120, a query circuit 1130, a chooser circuit 1140, and a digital storage device 1150. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machinery of the electronic device may be implemented in hardware, software, and/or firmware.

The processing circuit 1120 includes a processing circuit operable to analyze received sensor data for an indication of an expression by a person corresponding to a first displayed electronic content. For example, the received sensor data may include sensor data acquired by the response sensing apparatus 206 described in conjunction with FIG. 3. The query circuit 1130 includes a query circuit operable to cause a search for a second electronic content based on the indication of expression and on an attribute of the displayed first electronic content. In an alternative embodiment, the query circuit may include a query circuit operable to cause a search of an index for a second electronic content based on the indication of expression and on an attribute of the displayed first electronic content. In an embodiment, the search for a second electronic content may include a search of an index 1154 saved on the digital storage device. In another embodiment, the search for a second electronic content may include a search of at least one of a Web database, Web index, directory index, file index, content of a directory, or content of a file.

The chooser circuit 1140 includes a chooser circuit operable to select the second electronic content from a result of the search for a second electronic content. The digital storage device 1150 includes a storage device operable to save an indication of the selected second electronic content. For example, the indication of the selected second electronic content may be saved in a storage media 1152.

In an alternative embodiment, the electronic device 1104 may include a characterization circuit 1160 operable to determine the attribute of the displayed first electronic content. In another embodiment, the electronic device may include a transmitter circuit 1170 operable to send an indication of the selected second electronic content addressed to the requestor. In a further embodiment, the electronic device may include a receiver circuit 1110 operable to receive from a requestor sensor data acquired from a person and indicative of a response by the person to a display of a first electronic content. The receiver circuit may further include a receiver circuit operable to receive from a requestor sensor data acquired from the person and indicative of a response by the person to a display of a first electronic content, and to receive data that is indicative of the displayed first electronic content.

FIG. 19 illustrates an example computer program product. The computer program product includes a computer-readable medium 1210 bearing the program instructions. The computer program product also includes program instructions 1220 operable to perform a process in a computing device. The process includes receive sensor data from a requestor indicative of a response by a person to a viewed first content. The process also includes analyze the received sensor data for an indication of an expression by the person corresponding to the viewed first content. The process further includes facilitate a search of an index for a second content using a search parameter corresponding to the indicated expression and to a content attribute of the viewed first content. The process also includes return to the requester an indication of the second content.

In an alternative embodiment, the process further includes select the second content from a result of the search for a second content 1222. In another embodiment, the process further includes save data indicative of the selected second content 1224. In another embodiment, the computer-readable medium includes a computer storage medium.

FIG. 20 illustrates an example system 1300 that includes an electronic device 1305. The electronic device includes means 1310 for receiving data from a requestor indicative of a sensed response by a person to a first content displayed to the person. The electronic device also includes means 1320 for analyzing the received data for an indication of an expression by the person corresponding to the first content. The electronic device further includes means 1330 for facilitating a search for a second content using a search parameter corresponding to the indication of an expression by the person and to a content attribute of the displayed first content. The electronic device also includes means 1340 for returning to the requestor an indication of the second content. In alternative embodiments, the electronic device may include means 1350 for receiving an indication of a content attribute of the displayed first content. The electronic device may include means 1360 for determining a content attribute of the displayed first content The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
providing a computing device, the computing device including at least:
at least one processing device;
at least one memory;
at least one display;
at least one microphone;
at least one touch-sensitive keyboard; and
at least one optical sensor;
displaying a first content on the at least one display;
detecting a reaction by a person to the displayed first content, including at least:
acquiring at least some physiological-based data associated with the person, including at least (i) at least one sub-vocalization and at least one audio level associated with the at least one sub-vocalization from the at least one microphone, (ii) at least one keyed command and at least some key pressure data associated with the at least one keyed command from the at least one touch-sensitive keyboard, and (iii) at least a sensed gaze and a sensed dwell time associated with the sensed gaze from the at least one optical sensor; and
applying a pattern matching algorithm to the at least some physiological-based data associated with the person, the pattern matching algorithm operable to detect a change in physiological state indicative of the reaction by the person to the displayed first content;
searching for a second content at least partially based on the displayed first content and the detected reaction by the person to the displayed first content, including at least:
determining a first attribute, the first attribute including at least one of a file type, a category, or a classification associated with the displayed first content;
determining a second attribute, the second attribute including at least one of a recognized image object, a user tag, a subject, a color, a texture, a theme, or a description associated with the displayed first content;
identifying at least one correlation between the first attribute, the second attribute, and the detected reaction, the identified correlation including at least one of a positive reaction to the displayed first content or a negative reaction to the displayed first content;
causing a search for a second content, including at least:
causing, responsive to a positive reaction to the displayed first content, a search for a second content including at least the common first attribute and the common second attribute; or
causing, responsive to a negative reaction to the displayed first content, a search for a second content having one of (a) a common first attribute and a different second attribute or (b) a different first attribute and a common second attribute;

storing, in the at least one memory, one or more results of the caused search; and
selecting, from the one or more results of the caused search, a second content distinct from the first content; and
displaying the selected second content on the at least one display.

2. The method of claim 1, wherein the displaying a first content on the at least one display comprises:
displaying the first content on the at least one display, including at least displaying the first content in a manner perceivable by the person.

3. The method of claim 1, further comprising:
maintaining informational data corresponding to the second content.

4. The method of claim 1, wherein the detecting a reaction by a person to the displayed first content comprises:
detecting the reaction by the person to the displayed first content, including at least one of sensing, identifying, or recognizing the reaction by the person to the displayed first content.

5. The method of claim 1, wherein the detecting a reaction by a person to the displayed first content comprises:
detecting the reaction by the person to the displayed first content, including at least detecting a response by the person to the displayed first content.

6. The method of claim 1, wherein the detecting a reaction by a person to the displayed first content comprises:
detecting the reaction by the person to the displayed first content, including at least detecting a physical reaction by the person to the displayed first content.

7. The method of claim 1, wherein the detecting a reaction by a person to the displayed first content comprises:
detecting the reaction by the person to the displayed first content, including at least detecting an emotional reaction by the person to the displayed first content.

8. The method of claim 1, wherein the detecting a reaction by a person to the displayed first content comprises:
detecting the reaction by the person to the displayed first content, including at least directly detecting from the person a response of the person to the displayed first content.

9. The method of claim 1, wherein the detecting a reaction by a person to the displayed first content comprises:
detecting the reaction by the person to the displayed first content, including at least detecting a reaction state of the person to the displayed first content.

10. The method of claim 1, wherein the causing a search for a second content comprises:
causing the search for the second content, including at least searching a local data store for the second content.

11. The method of claim 1, wherein the causing a search for a second content comprises:
causing the search for the second content, including at least facilitating a search by a search engine for the second content.

12. The method of claim 1, wherein the causing a search for a second content comprises:
causing the search for the second content, including at least facilitating a search by a Web search engine for the second content.

13. The method of claim 1, wherein the causing a search for a second content comprises:
causing the search for the second content, including at least facilitating a search for the second content by a search algorithm responsive to the detected reaction.

14. A system, comprising:
a device, the device including at least:
  at least one processing device;
  at least one memory;
  at least one display;
  at least one microphone;
  at least one touch-sensitive keyboard; and
  at least one optical sensor; and
one or more instructions that, when executed on the device, cause the device to at least:
  display a first content on the at least one display;
  detect a reaction by a person to the displayed first content, including at least:
    acquiring at least some physiological-based data associated with the person, including at least (i) at least one sub-vocalization and at least one audio level associated with the at least one sub-vocalization from the at least one microphone, (ii) at least one keyed command and at least some key pressure data associated with the at least one keyed command from the at least one touch-sensitive keyboard, and (iii) at least a sensed gaze and a sensed dwell time associated with the sensed gaze from the at least one optical sensor; and
    applying a pattern matching algorithm to the at least some physiological-based data associated with the person, the pattern matching algorithm operable to detect a change in physiological state indicative of the reaction by the person to the displayed first content;
  search for a second content at least partially based on the displayed first content and the detected reaction by the person to the displayed first content, including at least:
    determining a first attribute, the first attribute including at least one of a file type, a category, or a classification associated with the displayed first content;
    determining a second attribute, the second attribute including at least one of a recognized image object, a user tag, a subject, a color, a texture, a theme, or a description associated with the displayed first content;
    identifying at least one correlation between the first attribute, the second attribute, and the detected reaction, the identified correlation including at least one of a positive reaction to the displayed first content or a negative reaction to the displayed first content;
    causing a search for a second content, including at least:
      causing, responsive to a positive reaction to the displayed first content, a search for a second content including at least the common first attribute and the common second attribute; or
      causing, responsive to a negative reaction to the displayed first content, a search for a second content having one of (a) a common first attribute and a different second attribute or (b) a different first attribute and a common second attribute;
    storing, in the at least one memory, one or more results of the caused search; and
    selecting, from the one or more results of the caused search, a second content distinct from the first content; and
  displaying the selected second content on the at least one display.

15. The system of claim 14, wherein the device comprises:
the device including at least one of a personal digital assistant (PDA), a mobile wireless communication device, a cell phone, a mobile communications device, a handheld communications device, or a portable computing device.

16. A system, comprising:
at least one processing device;
at least one memory;
at least one display;
at least one microphone;
at least one touch-sensitive keyboard;
at least one optical sensor;
circuitry configured for displaying a first content on the at least one display;
circuitry configured for detecting a reaction by a person to the displayed first content, including at least:
  circuitry configured for acquiring at least some physiological-based data associated with the person, including at least (i) at least one sub-vocalization and at least one audio level associated with the at least one sub-vocalization from the at least one microphone, (ii) at least one keyed command and at least some key pressure data associated with the at least one keyed command from the at least one touch-sensitive keyboard, and (iii) at least a sensed gaze and a sensed dwell time associated with the sensed gaze from the at least one optical sensor;
  circuitry configured for applying a pattern matching algorithm to the at least some physiological-based data associated with the person, the pattern matching algorithm operable to detect a change in physiological state indicative of the reaction by the person to the displayed first content;
circuitry configured for searching for a second content at least partially based on the displayed first content and the detected reaction by the person to the displayed first content, including at least:
  circuitry configured for determining a first attribute, the first attribute including at least one of a file type, a category, or a classification associated with the displayed first content;
  circuitry configured for determining a second attribute, the second attribute including at least one of a recognized image object, a user tag, a subject, a color, a texture, a theme, or a description associated with the displayed first content;
  circuitry configured for identifying at least one correlation between the first attribute, the second attribute, and the detected reaction, the identified correlation including at least one of a positive reaction to the displayed first content or a negative reaction to the displayed first content;
  circuitry configured for causing a search for a second content, including at least:
    circuitry configured for causing, responsive to a positive reaction to the displayed first content, a search for a second content including at least the common first attribute and the common second attribute; or
    circuitry configured for causing, responsive to a negative reaction to the displayed first content, a search for a second content having one of (a) a common first attribute and a different second attribute or (b) a different first attribute and a common second attribute;

circuitry configured for storing, in the at least one memory, one or more results of the caused search; and circuitry configured for selecting, from the one or more results of the caused search, a second content distinct from the first content; and circuitry configured for displaying the selected second content on the at least one display.

17. The system of claim 16, wherein the circuitry configured for detecting a reaction by a person to the displayed first content comprises:

the circuitry configured for detecting the reaction by the person to the displayed first content, the displayed first content including at least one image within at least one email received by the system.

18. The system of claim 16, wherein the circuitry configured for displaying a first content on the at least one display comprises:

the circuitry configured for displaying the first content on the at least one display, including at least displaying the first content in a manner perceivable by the person.

19. The system of claim 18, wherein the circuitry configured for displaying the first content on the at least one display, including at least displaying the first content in a manner perceivable by the person comprises:

the circuitry configured for displaying the first content on the at least one display, including at least displaying the first content in the manner perceivable by the person and in a manner designed to facilitate a detectable reaction from the person.

20. The system of claim 18, wherein the displaying the first content on the at least one display, including at least displaying the first content in a manner perceivable by the person comprises:

displaying the first content on the at least one display, including at least displaying the first content in the manner perceivable by the person and in a manner designed to facilitate a detectable reaction from the person.

21. The system of claim 16, further comprising:

circuitry configured for maintaining informational data corresponding to the second content.

22. The system of claim 16, wherein the circuitry configured for detecting a reaction by a person to the displayed first content comprises:

the circuitry configured for detecting the reaction by the person to the displayed first content, including at least one of sensing, identifying, or recognizing the reaction by the person to the displayed first content.

23. The system of claim 16, wherein the circuitry configured for detecting a reaction by a person to the displayed first content comprises:

the circuitry configured for detecting the reaction by the person to the displayed first content including at least detecting at least one of a positive or negative reaction by the person to the displayed first content.

24. The system of claim 16, wherein the circuitry configured for detecting a reaction by a person to the displayed first content comprises:

the circuitry configured for detecting the reaction by the person to the displayed first content at least partially based at least one indication that the person is viewing the displayed first content at least partially based on (i) the sensed gaze and (ii) the sensed gaze dwell time.

25. The system of claim 16, wherein the circuitry configured for detecting a reaction by a person to the displayed first content comprises:

the circuitry configured for detecting the reaction by the person to the displayed first content, including at least detecting a response by the person to the displayed first content.

26. The system of claim 16, wherein the circuitry configured for detecting a reaction by a person to the displayed first content comprises:

the circuitry configured for detecting the reaction by the person to the displayed first content, including at least detecting a physical reaction by the person to the displayed first content.

27. The system of claim 16, wherein the circuitry configured for detecting a reaction by a person to the displayed first content comprises:

the circuitry configured for detecting the reaction by the person to the displayed first content, including at least detecting an emotional reaction by the person to the displayed first content.

28. The system of claim 16, wherein the circuitry configured for detecting a reaction by a person to the displayed first content comprises:

the circuitry configured for detecting the reaction by the person to the displayed first content, including at least directly detecting from the person a response of the person to the displayed first content.

29. The system of claim 16, wherein the circuitry configured for detecting a reaction by a person to the displayed first content comprises:

the circuitry configured for detecting the reaction by the person to the displayed first content, including at least detecting a reaction state of the person to the displayed first content.

30. The system of claim 16, wherein the circuitry configured for detecting a reaction by a person to the displayed first content comprises:

the circuitry configured for detecting the reaction by the person to the displayed first content, the displayed first content including at least one or more of at least some displayed search results, at least some Internet search results, at least some sports results, at least some query results, at least some program lists, at least some music lists, at least some file lists, or at least some directory search results.

31. The system of claim 16, wherein the circuitry configured for detecting a reaction by a person to the displayed first content comprises:

the circuitry configured for detecting the reaction by the person to the displayed first content, the displayed first content including at least one or more of at least one displayed image, at least one avatar, at least one icon, at least one name, at least one title, at least one descriptor, or at least one broadcasted sound.

32. The system of claim 16, wherein the circuitry configured for detecting a reaction by a person to the displayed first content comprises:

the circuitry configured for detecting the reaction by the person to the displayed first content, the displayed first content including at least one or more of at least one visual-based first content, at least one image-based first content, at least one text-based first content, or at least one sound-based first content.

33. The system of claim 16, wherein the circuitry configured for detecting a reaction by a person to the displayed first content comprises:

the circuitry configured for detecting the reaction by the person to the displayed first content, the displayed first content including at least the content displayed by one or more of at least one mobile communications device, at least one handheld communications device, at least one desktop computing device, at least one limited resources computing device, at least one thin computing device, or at least one portable computing device.

34. The system of claim 16, wherein the circuitry configured for causing a search for a second content comprises:
the circuitry configured for causing the search for the second content, including at least searching a local data store for the second content.

35. The system of claim 16, wherein the circuitry configured for causing a search for a second content comprises:
the circuitry configured for causing the search for the second content, including at least facilitating a search by a search engine for the second content.

36. The system of claim 16, wherein the circuitry configured for causing a search for a second content comprises:
the circuitry configured for causing the search for the second content, including at least facilitating a search by a Web search engine for the second content.

37. The system of claim 16, wherein the circuitry configured for causing a search for a second content comprises:
the circuitry configured for causing the search for the second content, including at least facilitating a search for the second content by a search algorithm responsive to the detected reaction.

38. The system of claim 16, wherein the circuitry configured for causing a search for a second content comprises:
the circuitry configured for causing the search for the second content, including at least facilitating a search for at least two instances of second content.

39. The system of claim 16, wherein the circuitry configured for causing a search for a second content comprises:
the circuitry configured for causing the search for the second content, including at least facilitating a search via communicating with an Internet based search service.

40. The system of claim 16, wherein the circuitry configured for displaying the selected second content on the at least one display comprises:
the circuitry configured for displaying the selected second content on the at least one display, including at least displaying the selected second content in a manner perceivable by the.

41. The system of claim 16, wherein the circuitry configured for applying a pattern matching algorithm to the at least some physiological-based data associated with the person, the pattern matching algorithm operable to detect a change in physiological state indicative of the reaction by the person to the displayed first content comprises:
the circuitry configured for applying the pattern matching algorithm to the at least some physiological-based data associated with the person, including at least transmitting to a requestor at least one of raw sensor data, partially processed sensor data, or processed sensor data indicative of a response by the person to the displayed first content and receiving from the requestor data indicative of at least one content attribute of the displayed first content determined at least partially using the at least one of raw sensor data, partially processed sensor data, or processed sensor data indicative of a response by the person to the displayed first content.

42. The system of claim 16, wherein the circuitry configured for determining a first attribute, the first attribute including at least one of a file type, a category, or a classification associated with the displayed first content comprises:
the circuitry configured for determining the first attribute, including at least receiving data indicative of the first attribute at least partially via at least one of by network or by Internet, and
wherein the circuitry configured for determining a second attribute, the second attribute including at least one of a recognized image object, a user tag, a subject, a color, a texture, a theme, or a description associated with the displayed first content includes at least:
the circuitry configured for determining a second attribute, including at least receiving data indicative of the second attribute at least partially via the at least one of by network or by Internet.

43. The system of claim 16, wherein the circuitry configured for detecting a reaction by a person to the displayed first content comprises:
the circuitry configured for detecting the reaction by the person to the displayed first content, including at least determining at least one of interest or disinterest of the person in the displayed first content.

* * * * *